(12) United States Patent
Muirhead

(10) Patent No.: US 6,661,339 B2
(45) Date of Patent: Dec. 9, 2003

(54) HIGH PERFORMANCE FUEL TANK

(75) Inventor: Scott A. W. Muirhead, Surrey (CA)

(73) Assignee: Nextreme, L.L.C., Uniontown, PA (US)

( * ) Notice: Subject to any disclaimer, the term of this patent is extended or adjusted under 35 U.S.C. 154(b) by 0 days.

(21) Appl. No.: 10/134,049

(22) Filed: Apr. 26, 2002

(65) Prior Publication Data

US 2002/0113694 A1 Aug. 22, 2002

Related U.S. Application Data

(63) Continuation-in-part of application No. 09/770,097, filed on Jan. 24, 2001.
(60) Provisional application No. 60/177,382, filed on Jan. 24, 2000, and provisional application No. 60/286,450, filed on Apr. 27, 2001.

(51) Int. Cl.$^7$ ................................................ G08B 26/00
(52) U.S. Cl. .................... 340/505; 340/306; 340/31; 340/539.1; 220/562; 220/563
(58) Field of Search ...................... 340/506, 3.1, 539.1; 220/562, 563, 86.2, 4.13, 4.14

(56) References Cited

U.S. PATENT DOCUMENTS

| | | |
|---|---|---|
| 3,398,434 A | 8/1968 | Alesi, Jr. et al. |
| 3,583,036 A | 6/1971 | Brown |
| 3,597,799 A | 8/1971 | Earle |
| 3,695,188 A | 10/1972 | Granatstein |
| 3,702,100 A | 11/1972 | Wharton |
| 3,779,687 A | 12/1973 | Alesi |
| 3,783,078 A | 1/1974 | Brodhead |
| 3,787,158 A | 1/1974 | Brown et al. |
| 3,867,088 A | 2/1975 | Brown et al. |
| 3,868,209 A | 2/1975 | Howell |
| 3,919,382 A | 11/1975 | Smarook |
| 3,919,445 A | 11/1975 | Smarook |
| 3,919,446 A | 11/1975 | Smarook |
| 3,925,140 A | 12/1975 | Brown |
| 3,964,400 A | 6/1976 | Brand |
| 4,013,021 A | 3/1977 | Steinlein et al. |
| 4,070,839 A | 1/1978 | Clem |

(List continued on next page.)

FOREIGN PATENT DOCUMENTS

| | | |
|---|---|---|
| EP | 0 249 203 | 9/1990 |
| JP | 9-41756 | 2/1997 |
| JP | 10-32851 | 2/1998 |

(List continued on next page.)

OTHER PUBLICATIONS

English Abstract of Japanese Patent Publication 090041756 (Sep. 11, 1998).
English Abstract of Japanese Patent Publication 10032851 (Feb. 16, 1998).

(List continued on next page.)

Primary Examiner—Daryl Pope
(74) Attorney, Agent, or Firm—Harness, Dickey & Pierce, P.L.C.

(57) ABSTRACT

A fuel tank and method of making the same having three polymeric sheet members arranged in a stacked relationship to define a first volume and a second volume. The first volume being separate from said second volume to provide a number of advantages, such as a barrier to prevent puncture, minimize vapor release, aid in cooling, define a reserve cavity, minimize fluid movement, and the like.

44 Claims, 10 Drawing Sheets

U.S. PATENT DOCUMENTS

| | | |
|---|---|---|
| 4,079,232 A | 3/1978 | Brokoff et al. |
| 4,101,252 A | 7/1978 | Brown |
| 4,113,909 A | 9/1978 | Beasley |
| 4,133,270 A | 1/1979 | Ravera |
| 4,158,539 A | 6/1979 | Arends et al. |
| 4,164,387 A | 8/1979 | Schermutzki et al. |
| 4,164,389 A | 8/1979 | Beasley |
| 4,194,663 A | 3/1980 | West et al. |
| 4,244,915 A | 1/1981 | Boardman |
| 4,255,382 A | 3/1981 | Arends et al. |
| 4,287,836 A | 9/1981 | Aoki |
| 4,348,442 A | 9/1982 | Figge |
| 4,377,377 A | 3/1983 | Arends et al. |
| 4,428,306 A | 1/1984 | Dresen et al. |
| 4,464,329 A | 8/1984 | Whiteside et al. |
| 4,488,496 A | 12/1984 | Polacco |
| 4,500,213 A | 2/1985 | Grimm |
| 4,507,348 A | 3/1985 | Nagata et al. |
| 4,509,432 A | 4/1985 | Win |
| 4,509,909 A | 4/1985 | Arends |
| 4,513,048 A | 4/1985 | Kaube et al. |
| 4,531,901 A | 7/1985 | Andersen |
| 4,555,381 A | 11/1985 | Chazal et al. |
| 4,600,376 A | 7/1986 | Gillman et al. |
| 4,606,278 A | 8/1986 | Shuert |
| 4,608,009 A | 8/1986 | Whiteside et al. |
| 4,636,348 A | 1/1987 | Whiteside |
| 4,649,007 A | 3/1987 | Bonis et al. |
| 4,666,544 A | 5/1987 | Whiteside et al. |
| 4,742,781 A | 5/1988 | Shuert |
| 4,801,347 A | 1/1989 | Garwood |
| 4,846,077 A | 7/1989 | Win |
| 4,907,515 A | 3/1990 | Win |
| 4,969,812 A | 11/1990 | Brown |
| 5,007,225 A | 4/1991 | Teasdale |
| 5,030,501 A | 7/1991 | Colvin et al. |
| 5,042,396 A | 8/1991 | Shuert |
| 5,046,434 A | 9/1991 | Breezer et al. |
| 5,071,603 A | 12/1991 | Kurumaji et al. |
| 5,088,418 A | 2/1992 | Reckermann et al. |
| 5,108,529 A | 4/1992 | Shuert |
| 5,117,762 A | 6/1992 | Shuert |
| 5,123,359 A | 6/1992 | DelBalso |
| 5,123,541 A | 6/1992 | Giannini et al. |
| 5,143,778 A | 9/1992 | Shuert |
| 5,156,782 A | 10/1992 | Ballantyne |
| 5,164,211 A | 11/1992 | Comer |
| 5,167,969 A | 12/1992 | DeMaio, Jr. et al. |
| 5,168,817 A | 12/1992 | Nulle et al. |
| 5,197,395 A | 3/1993 | Pigott et al. |
| 5,197,396 A | 3/1993 | Breezer et al. |
| 5,225,213 A | 7/1993 | Brown et al. |
| 5,226,373 A | 7/1993 | Esch |
| 5,229,648 A | 7/1993 | Sues et al. |
| 5,255,613 A | 10/1993 | Shuert |
| 5,283,028 A | 2/1994 | Breezer et al. |
| 5,283,029 A | 2/1994 | Ellemor |
| 5,329,861 A | 7/1994 | McCarthy |
| 5,329,862 A | 7/1994 | Breezer et al. |
| 5,337,681 A | 8/1994 | Schrage |
| 5,351,627 A | 10/1994 | Junaedi |
| 5,351,628 A | 10/1994 | Breezer et al. |
| 5,351,629 A | 10/1994 | Breezer et al. |
| 5,367,960 A | 11/1994 | Schleicher |
| 5,367,961 A | 11/1994 | Arai et al. |
| 5,390,467 A | 2/1995 | Shuert |
| 5,391,251 A | 2/1995 | Shuert |
| 5,401,347 A | 3/1995 | Shuert |
| 5,402,735 A | 4/1995 | DeJean |
| 5,404,829 A | 4/1995 | Shuert |
| 5,407,632 A | 4/1995 | Constantino et al. |
| 5,408,937 A | 4/1995 | Knight, IV et al. |
| 5,413,052 A | 5/1995 | Breezer et al. |
| 5,427,732 A | 6/1995 | Shuert |
| 5,448,110 A | 9/1995 | Tuttle et al. |
| 5,470,641 A | 11/1995 | Shuert |
| 5,479,416 A | 12/1995 | Snodgrass et al. |
| 5,492,069 A | 2/1996 | Alexander et al. |
| 5,505,141 A | 4/1996 | Barber |
| 5,517,188 A | 5/1996 | Carroll et al. |
| 5,527,585 A | 6/1996 | Needham et al. |
| 5,531,585 A | 7/1996 | Lupke |
| 5,535,668 A | 7/1996 | Besaw et al. |
| 5,539,775 A | 7/1996 | Tuttle et al. |
| 5,555,820 A | 9/1996 | Shuert |
| 5,583,819 A | 12/1996 | Roesner et al. |
| 5,596,933 A | 1/1997 | Knight et al. |
| 5,606,921 A | 3/1997 | Elder et al. |
| 5,620,715 A | 4/1997 | Hart et al. |
| 5,624,622 A | 4/1997 | Boyce et al. |
| 5,624,630 A | 4/1997 | Breezer et al. |
| 5,635,129 A | 6/1997 | Breezer et al. |
| 5,635,306 A | 6/1997 | Minamida et al. |
| 5,638,760 A | 6/1997 | Jordan et al. |
| 5,649,295 A | 7/1997 | Shober et al. |
| 5,658,523 A | 8/1997 | Shuert |
| 5,661,457 A | 8/1997 | Ghaffari et al. |
| 5,664,322 A | 9/1997 | Best |
| 5,676,064 A | 10/1997 | Shuert |
| 5,686,928 A | 11/1997 | Pritchett et al. |
| 5,687,652 A | 11/1997 | Ruma |
| 5,708,423 A | 1/1998 | Ghaffari et al. |
| 5,716,581 A | 2/1998 | Tirrell et al. |
| 5,755,162 A | 5/1998 | Knight et al. |
| 5,769,003 A | 6/1998 | Rose et al. |
| 5,774,876 A | 6/1998 | Woolley et al. |
| 5,778,801 A | 7/1998 | Delacour |
| 5,782,129 A | 7/1998 | Vanderzee et al. |
| 5,791,262 A | 8/1998 | Knight et al. |
| 5,794,542 A | 8/1998 | Besaw |
| 5,794,544 A | 8/1998 | Shuert |
| 5,800,846 A | 9/1998 | Hart |
| 5,813,355 A | 9/1998 | Brown et al. |
| 5,814,185 A | 9/1998 | Chun et al. |
| 5,818,348 A | 10/1998 | Walczak et al. |
| 5,822,683 A | 10/1998 | Paschen |
| 5,822,714 A | 10/1998 | Cato |
| 5,830,299 A | 11/1998 | Teixidor Casanovas et al. |
| 5,834,535 A | 11/1998 | Abu-Isa et al. |
| 5,836,255 A | 11/1998 | Uitz |
| 5,843,366 A | 12/1998 | Shuert |
| 5,845,588 A | 12/1998 | Gronnevik |
| 5,860,369 A | 1/1999 | John et al. |
| 5,862,760 A | 1/1999 | Kohlhaas |
| 5,868,080 A | 2/1999 | Wyler et al. |
| 5,879,495 A | 3/1999 | Evans |
| 5,885,691 A | 3/1999 | Breezer et al. |
| 5,894,803 A | 4/1999 | Kuga |
| 5,900,203 A | 5/1999 | Needham et al. |
| 5,908,135 A | 6/1999 | Bradford et al. |
| 5,921,189 A | 7/1999 | Estepp |
| 5,929,779 A | 7/1999 | MacLellan et al. |
| 5,933,354 A | 8/1999 | Shimada et al. |
| 5,936,527 A | 8/1999 | Isaacman et al. |
| 5,942,987 A | 8/1999 | Heinrich et al. |
| 5,950,545 A | 9/1999 | Shuert |
| 5,950,546 A | 9/1999 | Brown et al. |
| 5,955,950 A | 9/1999 | Gallagher, III et al. |
| 5,963,144 A | 10/1999 | Kruest |
| 5,967,057 A | 10/1999 | Nakayama et al. |
| 5,971,592 A | 10/1999 | Kralj et al. |

| | | | |
|---|---|---|---|
| 5,973,599 A | 10/1999 | Nicholson et al. | |
| 5,975,879 A | 11/1999 | Dresen et al. | |
| 5,980,231 A | 11/1999 | Arends et al. | |
| 5,984,126 A | 11/1999 | Gordon | |
| 5,986,569 A | 11/1999 | Mish et al. | |
| 5,986,570 A | 11/1999 | Black et al. | |
| 5,993,724 A | 11/1999 | Shuert | |
| 5,999,091 A | 12/1999 | Wortham | |
| 6,006,677 A | 12/1999 | Apps et al. | |
| 6,013,949 A | 1/2000 | Tuttle | |
| 6,018,641 A | 1/2000 | Tsubouchi et al. | |
| 6,018,927 A | 2/2000 | Major | |
| 6,021,721 A | 2/2000 | Rushton | |
| 6,025,780 A | 2/2000 | Bowers et al. | |
| 6,027,027 A | 2/2000 | Smithgall | |
| 6,029,583 A | 2/2000 | LeTrudet | |
| 6,138,859 A | 10/2000 | Aulph et al. | |
| 6,176,260 B1 | 1/2001 | Hahner et al. | |
| 6,179,145 B1 | 1/2001 | Roth | |
| 6,184,269 B1 | 2/2001 | Abu-Isa et al. | |
| 6,199,488 B1 | 3/2001 | Favaron et al. | |
| 6,223,526 B1 | 5/2001 | Wissler et al. | |
| 6,268,037 B1 | 7/2001 | Butler et al. | |
| 6,276,387 B1 | 8/2001 | Pachciarz et al. | |
| 6,293,420 B1 | 9/2001 | Richter et al. | |
| 6,294,127 B1 | 9/2001 | Huse | |
| 6,305,568 B1 | 10/2001 | Suzuki et al. | |
| 6,328,842 B1 | 12/2001 | Coninck et al. | |
| 6,338,420 B1 * | 1/2002 | Pachciarz et al. | 220/562 |
| 6,372,079 B1 | 4/2002 | Coninck et al. | |
| 6,372,176 B1 | 4/2002 | Ekendahl et al. | |
| 6,379,606 B1 | 4/2002 | Chun et al. | |
| 2001/0013516 A1 | 8/2001 | Boecker | |
| 2001/0020622 A1 | 9/2001 | Schmidt et al. | |
| 2001/0045433 A1 | 11/2001 | Ellis | |
| 2002/0017745 A1 | 2/2002 | Vorenkamp et al. | |
| 2002/0020487 A1 | 2/2002 | Vorenkamp et al. | |
| 2002/0020705 A1 | 2/2002 | Vorenkamp et al. | |
| 2002/0063129 A1 | 5/2002 | Potter et al. | |
| 2002/0066737 A1 | 6/2002 | Stack et al. | |
| 2002/0081346 A1 | 6/2002 | Ekendahl et al. | |

FOREIGN PATENT DOCUMENTS

| | | |
|---|---|---|
| WO | WO 98/21691 | 5/1998 |
| WO | WO 98/36929 | 8/1998 |
| WO | WO 99/14485 | 3/1999 |
| WO | WO 99/44851 | 9/1999 |
| WO | WO 99/56977 | 11/1999 |
| WO | WO 99/64221 | 12/1999 |
| WO | WO 00/43230 | 7/2000 |
| WO | WO 00/47437 | 8/2000 |
| WO | WO 00/48859 | 8/2000 |
| WO | WO 00/64694 | 11/2000 |
| WO | WO 00/74965 A1 | 12/2000 |
| WO | WO 01/00433 A1 | 1/2001 |
| WO | WO 02/36380 A1 | 5/2002 |

OTHER PUBLICATIONS

FastTrack™ Series RFID Tags, Escort Memory Systems, Inc. 1999, Publication No. 17–5128, 6 pages.

Jay Werb & Colin Larel, http://www.pinpointco.com/_private/whiteppaer/frid/html, Designing a Positioning System for Finding Things and People Indoors, 11 pages, 1998.

Kevin R. Sharp, http://www,idsystems.com/reader/1999_11/good 1199.htm, Good Design Makes RFID Work, 4 pages, Nov. 1999.

Kevin R. Sharp, http://www.idsystems.com/implementer/articles/deli0299.htm, A Delicate Balance: Multifrequency RF Management, 4 pages, Feb. 1999.

Kevin R. Sharp, http://www.idsystems.com/reader/1999_03/phys0399.htm, Physical Reality, 4 pages, Mar. 1999.

Kevin R. Sharp, http://www.idsystems.com/reader/1999_05/join0599.htm, Joint Venture Produces New RFID Chips, 4 pages, May 1999.

Kevin R. Sharp, http://www.idsystems.com/reader/1999_05/less0599.htm, Lessons from the Front, 5 pages, May 1999.

Kevin R. Sharp, http://www.idsystems.com/reader/1999_09/rfid0999.htm, RFID: What's It Worth to You?, 4 pages, Sep. 1999.

MicroID™ 125 kHz RFID System Design Guide, entire booklet, 1998 Microchip Technology Inc., Dec. 1998.

Paul Quinn, http://www.idsystems.com/reader/1999_05/comm0599/comm09599.htm, Could this be the Start of Something Big?, 2 pages, May 1999.

Paul Quinn, http://www.idsystems.com/reader/2000_01/high0100/high0100.htm, A Highly Pallet–able Solution, 3 pages, Jan. 2000.

Plastics News article, Visteon Corp. to Thermoform Fuel Tanks, Crain Communications Inc., Oct. 16, 2000, 2 pages.

Tag–it™ Inlays, Texas Instruments, 2 sheets, 1999.

Press Release from TI Group, http:www.tiauto.com, Codebreakers, 1 page, Dec. 2001.

Automotive Industries, Fuel Tank System, featured in New Product Section, p. 90, Feb. 2001.

Modern Plastics, www.modplas.com, News Briefs, Visteon Readies Thermoforming for Fuel Tanks, p. 14, Feb. 2001.

Automotive Plastics, News & Views, Steel and Plastics Square Off Over Fuel Tanks, pp. 12–14.

Jan H. Schut, http://www.plasticstechnology.com/Scripts/SP–MainPT . . . \200012fal.htm, Move Over Blow Molding, 8 pages, Dec. 2000.

Cheryl German, http:www.kiefeltech.com/march_10_2000_2.htm, KTI Announces New Process for the Manufacture of Fuel Tanks Using Twin Sheet Forming, 2 pages, Mar. 10, 2000.

Rhoda Miel, http:www.plasticsnews.com/subscriber/headlines2.phtm, TI develops way to cap emissions, 2 pages, Dec. 1, 2000.

Eliminating Emissions, http:www.visteon.com/news/features/091300.html, 2 pages, Oct. 18, 2000.

Rhoda Miel, http:www.plasticsnews.com/subscriber/headlines2.phtm, Mannesmann eyes injection molded fuel tank, 2 pages, Mar. 9, 2001.

* cited by examiner

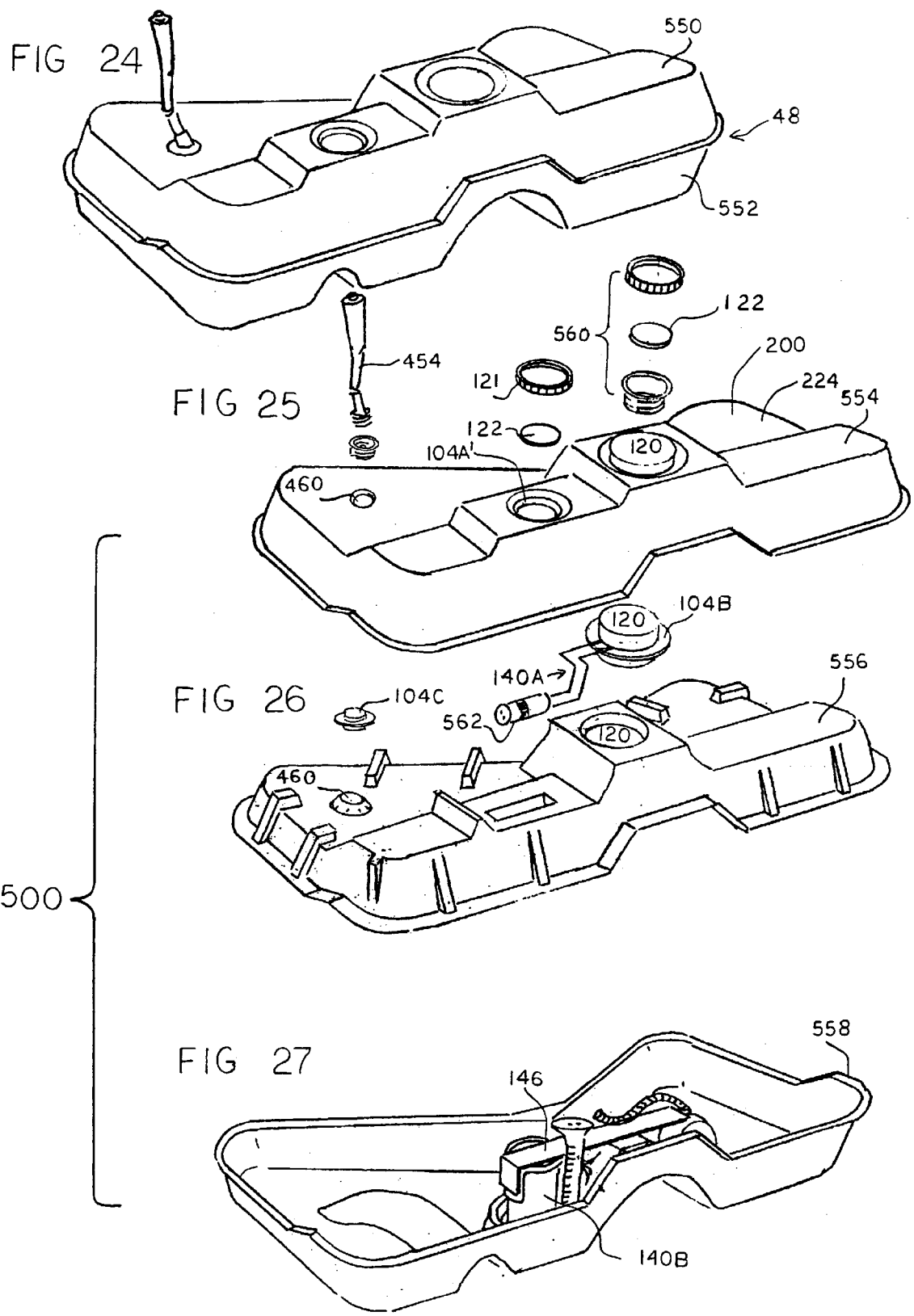

HIGH PERFORMANCE FUEL TANK

CROSS-REFERENCE TO RELATED APPLICATIONS

This application is a continuation-in-part of U.S. patent application Ser. No. 09/770,097 filed on Jan. 24, 2001, which claims the benefit of U.S. Provisional Application No. 60/177,383, filed Jan, 24, 2000. This application further claims the benefit of U.S. Provisional Application No. 60/286,450, filed Apr. 27, 2001. The disclosures of the above applications are incorporated herein by reference.

FIELD OF THE INVENTION

The present invention generally relates to fuel storage apparatus and, more particularly, relates to a triple sheet thermoformed fuel tank with high performance aspects for use in light-duty vehicles.

BACKGROUND OF THE INVENTION

It is well known in the art to provide fuel storage apparatus such as gas tanks to hold the fuel used by an engine adapted to propel a land vehicle. Two types of fuel tank are most common. A first type includes steel fuel tanks that generally comprise an upper shell half and a lower shell half joined by known manner to provide a steel fuel storage fuel tank. The second type includes polymeric fuel tanks that are characteristically formed according to blow molding and, to a lesser extent, injection, and thermoform molding processes to provide a plastic fuel storage tank.

In the past decade, global steel fuel tank production has experienced a significant decline while polymeric fuel tanks have enjoyed exceptional growth. Although steel fuel tanks are durable, they are also heavy weight, which increases fuel consumption. Polymeric fuel tanks are lightweight, relatively low cost and can be readily molded into complex shapes for optimum space utilization. Worldwide tailpipe emission limits and other competitive influences have finally caused automobile manufacturers to use polymeric fuel tanks in ever-greater numbers.

Polymeric fuel tanks have problems. There are limitations imposed upon fuel tank apparatus by the molding equipment deployed for their manufacture. Improvements in the blow molding art are in particular required to meet new and more stringent light-duty vehicle emission limits. For example, fuel tank vapor emission limits represent new areas of heightened concern. The permeability of blow-molded fuel tanks has led some automobile manufacturers to reconsider the potential low permeability of hydro-formed steel fuel tanks to meet the more stringent fuel tank emission limits.

Several potential areas of evaporative emission characterize fuel tanks. A first area of concern is permeability at a seam between two fuel tank halves in the case of steel and thermoformed fuel tanks, and along any seams of a blow-molded fuel tank. A second area of concern is emission at the openings at the tank interface with the external and internal fuel system components. The fuel system components generally include a Filler Pipe Assembly, a Vapor Control System, Engine Fuel and Vapor Lines, and a Sender Unit. Each of these fuel system components itself comprises an array of complex sub-components.

The first problem area of permeability at a seam is greater in steel and thermoformed plastic fuel tanks than in blow molded fuel tanks. The art of blow molding is characterized by the expansion of a stream of thermoplastic within a hollow mold, as characterized by Boechker in Publication No. 2001/0013516 A1. The blow molding process yields a substantially seamless body. Multi layered streams of blow-molded plastic are also used for several aspects principally including impermeability.

Seams are unavoidable characteristics of both steel and thermoformed plastic fuel tanks. Both processes contemplate the uniting of two fuel tank halves. The steel fuel tank industry is decreasing emissions at the seam with improved welding, adhesive, gasket, and coating technologies. The steel industry is also experimenting with steel blow molding. Thermoformed fuel tanks are now preferably composed of composite sheets that possess interior layers of non-permeable polymeric material, as set forth in International Publication No. WO 00/43230 to Sadr or U.S. Publication No. 2001/0045433 to Ellis. The composite sheet is co-extruded in known manner. The barrier layers are substantially thermally bonded together in a twin-sheet compression phase to provide a near non-permeable seam. Thus, permeability at the seam is less of a problem today than in the past.

The second problem area of permeability at interfaces between a fuel tank and its fuel system components has lead to several advancements in polymeric fuel tanks in particular. For example, many of the fuel system components are integrated into the tank itself to reduce the number of openings and connections that contribute to fuel tank emissions. This approach is known as Ship-in-a-Bottle, and has been readily practiced in the steel fuel tank sector for some time. The Ship-in-a-Bottle (SIB) technique is particularly amenable in the thermoforming process. The SIB approach is problematic for blow molding, as described by Boechker in Publication No. 2001/0013516 A1. The SIB amenability of thermoforming will result in a relative decline of blow molded and a relative increase of thermoformed fuel tanks in the coming years. Although SIB has been demonstrated by technologically advanced blow molding practitioners, over-all economic factors favor a shift toward increased global thermoformed fuel tank production because of the ease with which the SIB technique may be implemented.

The SIB technique has been adapted in recent years for a number of purposes. For example, in U.S. Pat. No. 6,138,859 to Aulph et al. an internal component-carrying cradle is adapted with baffle aspects that reduce the sloshing noises of moving fuel within the fuel tank. A cradle with baffle aspects and integral lines and connectors is also disclosed in Boechker in Publication No. 2001/0013516 A1.

The SIB method has been practiced in the thermoforming industry for many years. For example, Spencer Industries Incorporated of Dale Ind. provides an eight-page brochure showing a "Door-In-A-Door" refrigerator door wherein it is written "During the twin sheet forming process, a three piece injection molded internal hinge assembly is inserted by means of a pick and place robot". In the present case, the pick and place robot is positioned exteriorly adjacent the form station of a four-station Brown twin sheet thermoforming machine.

In U.S. Publication No. 2002/0017745 to Vorenkamp et al. a hybrid thermoforming methodology is suggested providing a SIB function. Although it may be argued the thermoforming methodology is known in the art, such as in U.S. Pat. Nos. 3,779,687 to Alesi and 6,372,176 to Edendahl et al., the problem with the Vorenkamp method is that synchronization of two parallel lines would be problematic and far less productive, ultimately, than two conventional rotary style twin sheet thermoforming machines characteristic in the industry.

The cradle carrying the internal fuel system components is characteristically made of the same material as the inside walls of the fuel tank. The thermal plastic cradle may be fused in place within the fuel reservoir by compressing the cradle against a heated wall of the fuel tank in the process of twin sheet thermoforming, as in U.S. Pat. No. 6,138,859. Alternatively, an adapter for welding the cradle to the fuel tank wall may be attached to the cradle for this purpose as in Vorenkamp Publication No. 2002/0020487. A second method to locate a cradle within the fuel tank is with a combination of recesses and projections, for example, as in U.S. Pat. No. 6,176,260 to Hahner et al.

The described shift from blow molding to thermoforming has caused the blow molding industry to enjoin the threat posed by twin sheet thermoforming by advancing the art. For example, Schwochert in International Publication No. WO 00/48859 discloses a fuel tank with a molded polymeric cover providing a fuel vapor collection chamber. According to Schwochert's method, the exteriorly visible fuel system components and body seams are enclosed with a polymeric cover by way of secondary operations thereby trapping any fuel vapors that may escape from the body seams and the connections of the fuel system components. According to this remedial approach, deployed blow molding machinery may be kept in service with the aid of such auxiliary intervention. One problem with the Schwochert approach concerns the bond between the cover and the complex tank body. It is anticipated that the cover itself will be difficult to bond to the polymeric fuel tank, which could result in unacceptable vapor leaks at the cover seam.

Although thermoforming is amenable to the Ship-in-a-Bottle advantage, thermoforming nonetheless is a relatively new fuel tank enabling technology and several problems have been identified. In particular, once the fuel system components have been enclosed within a twin sheet thermoformed structure, access for further manufacturing sub-assembly and in-field service and repair must be provided in order to implement a thermoformed fuel tank. As may be appreciated by referring to FIG. 3 of International Publication No. WO 00/74965, this is not a problem with blow molding techniques. The blow molding process can be readily adapted to provide threaded flange elements upon an exterior surface of the fuel tank body wherein the threaded flanges receive a removable cap or a developed cover for both assembly and service purposes.

In U.S. Pat. No. 6,179,145 B1 a thermoformed fuel tank with an inspection tower receiving a threaded sealing cover is suggested. Unlike International Publication No. WO 99/56977, which disclosed a similar approach for a blow molded fuel tank, there is no suggestion in '145 as to how this approach can be reduced to practice by a thermoforming practitioner. Although means for accessing internal fuel tank components for repair and service are clearly suggested, the approach of '145 is found wanting in several ways. In particular, the inspection tower is provided so a service port can be opened and then later sealed by an in-field repair technician. This methodology does not contemplate using a service port to finally assemble and connect the fuel system components to the fuel tank body in the manufacturing stage. Therefore, these sub-assembly operations must occur before the fuel tank halves can be joined together in secondary operations, such as by the suggested method of welding. The '145 scheme eliminates the inherent advantage of joining the heated sheets in an instant twin-sheet forming phase, and using a threaded inspection tower opening as means to access, sub-assemble, connect, inspect, service and seal the fuel system components associated with a thermoformed fuel tank.

Thus, it may be appreciated through a review of the prior patent art and related non-patent publications that the thermoforming process provides several key advantages that may be readily adapted to thermoformed fuel tanks. These understood advantages include SIB, rapid twin sheet manufacture (a process which may be appreciated by referring to U.S. Pat. No. 3,925,140 to Brown), and the ready use of composite polymeric sheet with engineered properties. There are, however, several unknown thermoforming processes advantages that can be applied to fuel tank apparatus. It is therefore desirable to identify these unknown advantages so that the thermoforming art can be fully utilized as an enabling technology to provide high-performance fuel storage apparatus.

SUMMARY OF THE INVENTION

It is, therefore, one objective of the present invention to provide high-performance fuel storage apparatus for light-duty vehicles. According to this object, advanced thermoforming technologies are adapted to provide fuel tanks having at least three composite polymeric sheets.

According to this object, the fuel tank can be instantaneously thermoformed into a unitary article for a rapid production cycle. According to further aspects of this object, one or more composite polymeric sheets are provided enabling fuel tank improvements and enhanced functionality.

It is another object of the present invention to provide a fuel tank with at least two hollow sections between at least three composite polymeric sheets. According to this object, one or more hollow sections are provided yielding advanced fuel tank characteristics.

It is yet another object to provide one or more threaded elements upon at least one of the composite polymeric sheets forming a thermoformed fuel tank. According to an aspect of this object, the threaded elements enable post-forming sub-assembly operations to be completed most efficiently. Still according to this aspect, fuel system components are connected to threaded elements that may be readily serviced by in-field technicians.

It is still another object to utilize a plurality of engineered composite polymeric sheet of greater or lesser thickness in cross-section, along with filler rigidified substrates, vapor barrier layers, RF transparency, intumescent surfaces, improved thermal bonding enhancements as well as other features and aspects. According to this aspect, more economical, technically sophisticated and emissions compliant fuel tanks with high-performance features may be used in light-duty vehicles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings wherein:

FIG. 24 is a perspective view illustrating another exemplary fuel storage apparatus;

FIG. 25 is a perspective view illustrating the top half of the exemplary fuel storage apparatus;

FIG. 26 is a perspective view illustrating the interior sheet of the exemplary fuel storage apparatus; and FIG. 27 is a perspective view illustrating the bottom half of the exemplary fuel storage apparatus.

DETAILED DESCRIPTION OF THE PREFERRED EMBODIMENTS

The following description of the preferred embodiment(s) is merely exemplary in nature and is in no way intended to limit the invention, its application, or uses.

The recently invented apparatus and methods of Triple Sheet Thermoforming are unknown to the practitioners of the most current Twin Sheet Thermoforming arts. The apparatus and methods of triple sheet thermoforming are described in the present inventor's co-pending U.S. patent application Ser. No. 09/377,792, entitled Triple Sheet Thermoformed Apparatus, Methods and Articles, filed Aug. 20, 1999, now U.S. Pat. No. 6,294,114. Further preferred embodiments of the methods of triple sheet thermoforming will be known by referring to other co-pending U.S. patent applications in the present inventor's name. These other applications are entitled "Thermoformed Apparatus Having a Communications Device", originally filed Jan. 24, 2000 as U.S. Provisional Application No. 60/177,383; and "Thermoformed Platform", originally filed Apr. 11, 2000 as U.S. Provisional Application No. 60/196,127; and "Triple Sheet Thermoforming Apparatus", a continuation-in-part application filed Jul. 5, 2001 as U.S. patent application Ser. No. 09/898,457. These patent application references are incorporated herein in their entireties by such reference.

Figure 1:
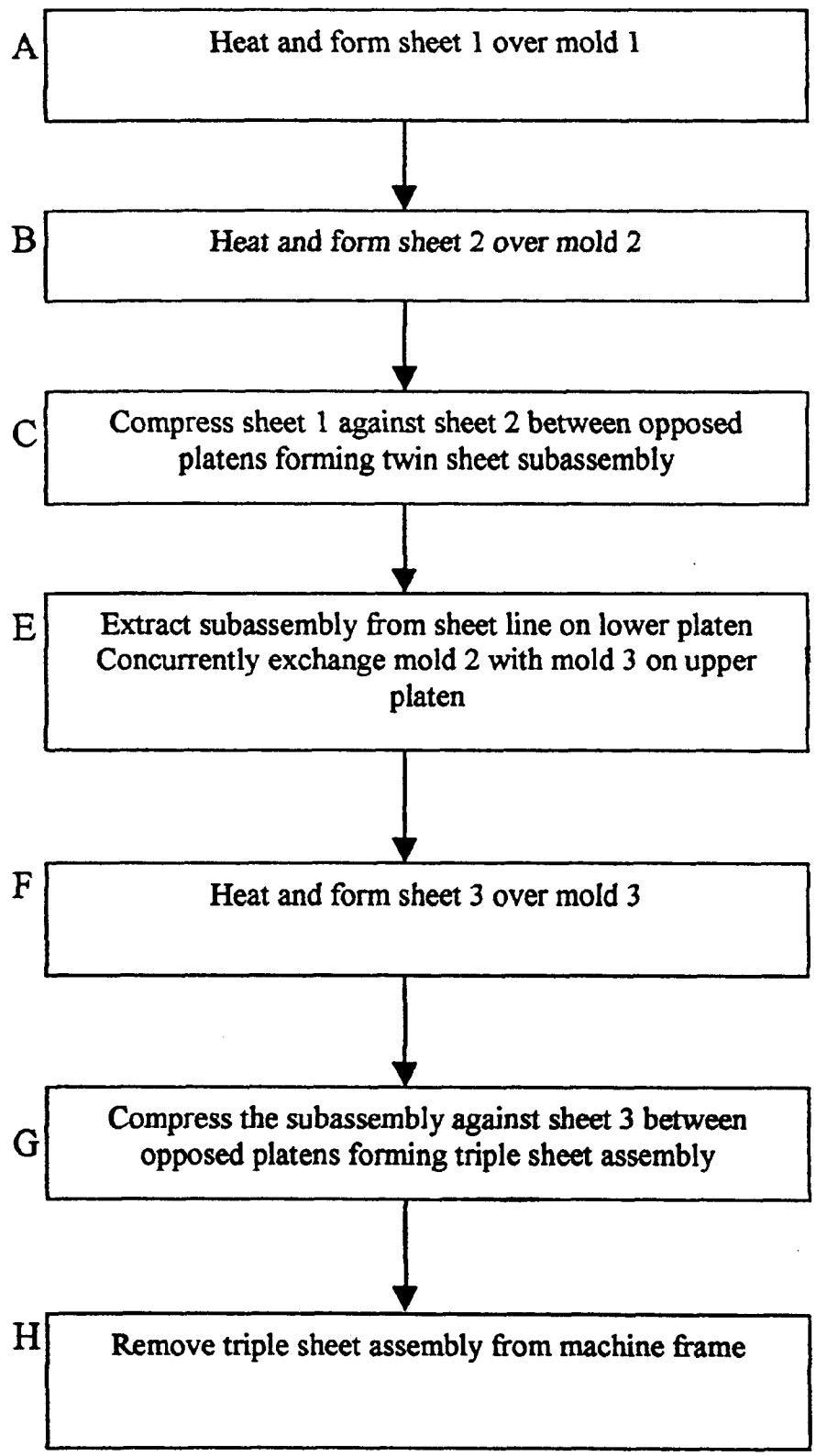
FIG. 1 is a flow chart illustrating a method of manufacturing a three-sheet high-performance fuel tank according to the principles of the present invention.

Thus, it may be appreciated that the method of triple sheet thermoforming involves a process whereby three composite polymeric sheets are successively heated in three ovens, separately thermoformed over three co-acting mold surfaces and sequentially compressed together between two opposed platens in both twin and triple sheet phases. The triple sheet process yields an instant unitary article comprising three sheets of plastic, whereby a third continuous sheet is between a first sheet forming a first fuel tank half and a second sheet forming a second fuel tank half. The method sequence may be understood by referring to FIG. 1. It should be understood, however, that the invention is not intended to be limited by the specific sequence described therein, but may include other sequences as preferred by the triple sheet practitioner and described in the referenced art.

A number of different fuel storage tank configurations may be used in the design and construction of triple sheet fuel tanks. A triple sheet fuel tank enables several improvements over twin sheet fuel tanks as will be described below. Three such configurations according to the principles of the present invention are set forth in FIGS. 2, 3 and 4. A prior art twin sheet fuel tank is illustrated in FIG. 5.

Figure 2:
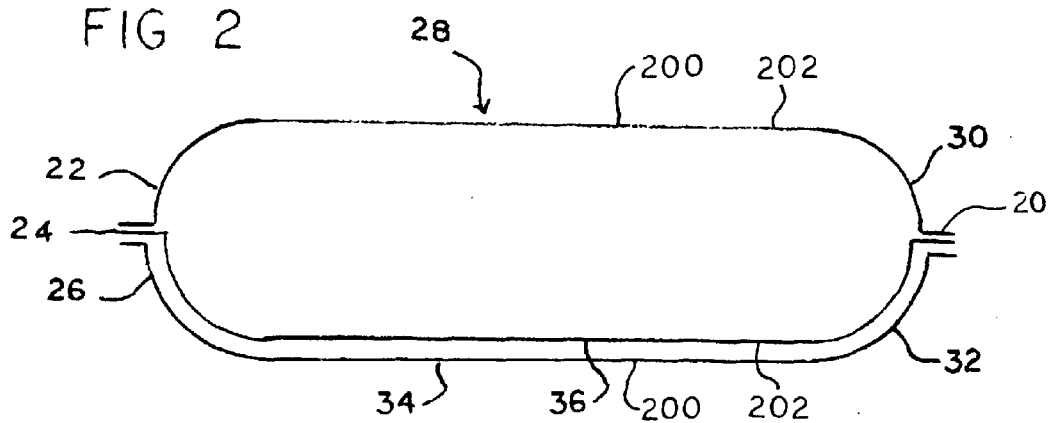
FIG. 2 is a cross-sectional schematic view illustrating a three-sheet assembly high-performance fuel tank having a double-walled bottom half according to the principles of the present invention.

In FIG. 2, three composite polymeric sheets 22, 24 and 26 are molded and instantly compressed together to provide fuel tank body 28 comprising a single walled top-half 30 and a double-walled bottom half 32. In the present embodiment, sheet 26 is adapted to preserve the fuel containing integrity of an interior sheet 24 of the fuel tank body 28. Other advantages are discussed below in further reference of the present description.

Figure 3:
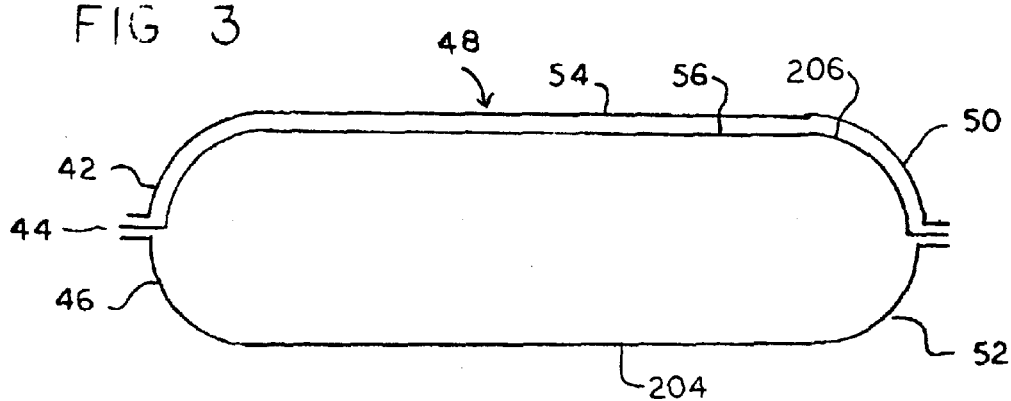
FIG. 3 is a cross-sectional schematic view illustrating the three-sheet assembly high-performance fuel tank having a double-walled top half.

Referring now to FIG. 3, three composite polymeric sheets 42, 44 and 46 are molded and compressed together to provide an instant fuel tank body 48 comprising a double walled top-half 50 and a single walled bottom half 52. The top-half 50 comprises exterior top member 54 and interior top member 56. In the present embodiment of FIG. 3, sheet 42 is adapted to provide protection preserving the fuel containing integrity of an interior sheet 44 of the fuel tank body 48. Other advantages are discussed below in further sections of the present description.

Figure 4:
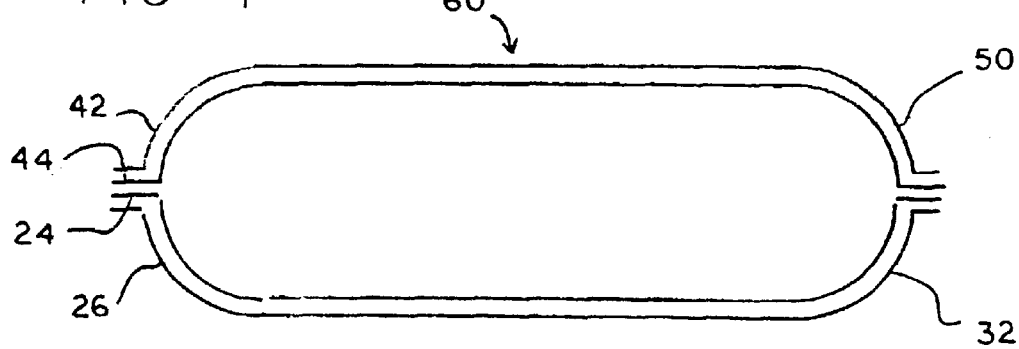
FIG. 4 is a cross-sectional schematic view illustrating the three-sheet assembly high-performance fuel tank having a double-walled top half and bottom half.
Figure 5:
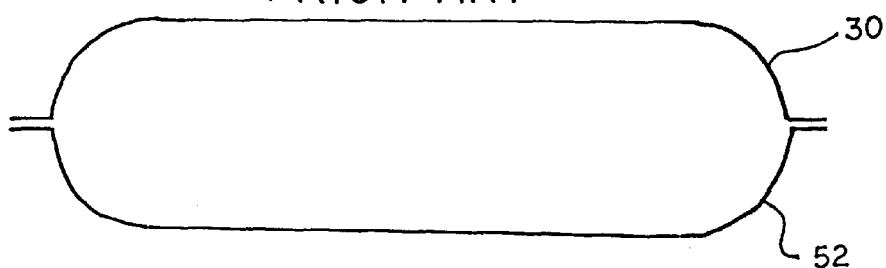
FIG. 5 is a cross-sectional schematic view illustrating a two-sheet fuel tank according to the prior art.

Referring now to FIG. 4, four composite polymeric sheets are thermoformed to provide fuel tank 60. Fuel tank 60 is manufactured according to a quadruple sheet thermoforming methodology involving four sheets, at least three ovens, four molds on two shuttle systems and two moving platens. The four sheets in the present embodiment of FIG. 4 may be represented by sheets 54 and 56 forming the double walled top half 50 and sheets 34 and 36 forming the double walled bottom half 32. It should be understood, however, that the invention is not intended to be limited by the specific composite sheets described herein, but may include other polymeric composite sheets as may be preferred by the triple sheet practitioner.

In regards to composite polymeric sheets of the FIGS. 2, 3, and 4, it would be advantageous to provide a number of different composite polymeric sheets having certain desirable properties and functionality. The composite polymeric sheets would comprise a plurality of layers of engineered polymeric materials. A composite polymeric sheet may comprise at least one layer selected from a group of layers consisting of the following compositions or functionality:

a) An intumescent composition 200 (FIG. 2) suitable for deflecting fire and heat of fire away from the combustible fuel contained within the fuel tank body. Such intumescent compositions may be known by referring to U.S. Pat. Nos. 5,834,535 and 6,184,269, both to Abu-Isa et al., and 5,984,126 to Gordon, which are incorporated herein by such reference.

b) A fuel barrier composition 202 (FIG. 2) suitable for inhibiting the escape of fuel vapors through the body of the fuel tank. The barrier composition may comprise materials such as ethylene vinyl alcohol copolymer (EVOH) or any other materials that would substantially inhibit the passage of hydrocarbon vapor through the walls and seams of a fuel tank.

c) An electrically conductive composition 204 (FIG. 3) ensuring static electricity does not build up and assisting in grounding the fuel tank. The electrically conductive composition may include carbon materials, although other materials are envisioned as well, which carbon materials may also aid in the ultra-violet stability of exteriorly exposed fuel tank surfaces.

d) An electroplateable composition 206 (FIG. 3).

e) An adhesive agent composition 208, the adhesive agent composition being suitable for bonding, such as for example thermally or chemically, dissimilar compositions during the sheet extrusion and/or thermoforming phases of fuel tank manufacture.

f) A polyolefin composition 210 comprising any thermoplastic resins from a group of resins comprising at least polyethylene, polypropylene and including modified polyolefin with predetermined functionality. The polyolefin composition, in particular any high density polyethylene composition, being a relatively inexpensive, readily moldable and rugged material providing a substantial portion of the polymeric sheet composition as will be described.

g) A filled polyolefin composition 212 (FIG. 2) comprising any filler from a group of fillers comprising talc, silica, glass fibers or beads, cellulose, natural fibers, organic matter, a thermosetting resin, carbon, a pigment, metallic particles, nano-compounds or fire retardant substances including organophosphates and any other functional filler as may be preferred by the thermoforming practitioner. The filled polyolefin composition providing improved physical properties selected from a group of properties including impact resistance, hardness, flexural stiffness, tensile strength and modulus, elongation at break, tear strength, chemical resistance, environmental stress crack resistance, thermal shock resistance, color, ultra-violet stability, fire resistant, and any other physical property that may be envisioned.

h) A regrind composition 214 comprising post-industrial, post-consumer or any combination of the compositions listed above generated as a byproduct of the thermoformed fuel tank manufacturing operation. The regrind composition being beneficially used to reduce industrial waste and lower the over-all cost of fuel tank manufacture.

i) A Radio Frequency amenable composition 215 that will permit communications devices residing within the structure to receive and send data signals. Such a composition, for example may omit carbon or other conductive materials that provide UV stability or other functionality.

It is to be understood that any of the listed compositions may be included in any combination in any one of the single polymeric composite sheets that may be used to construct a triple sheet thermoformed fuel tank.

Thus, it may be appreciated that the methodologies of triple and quadruple sheet thermoforming may be utilized to provide multi-cavity fuel tanks comprised of multi-layer multi-purpose composite polymeric sheets. An important advantage of either of the triple or quadruple sheet methodologies is that a selectively double walled fuel tank can be instantly thermoformed in a single and rapid manufacturing operation for maximum production efficiency.

In the following descriptive sections below, the purposes, end uses, and functionality of the different aspects of double walled and multi-cavity fuel tanks is described so that as an enabling technology, triple sheet thermoforming can be used to provide high-performance fuel tank apparatus options for the automotive designer. It should be understood, however, that the invention is not intended to be limited by the specific arrangements described and shown, but may include other arrangement as preferred by the triple sheet practitioner. For example, the over-laying seams 20 of the three conjoined sheets may be configured vertically rather than horizontally, as seen in proceeding FIGS. 2, 3, and 4. In this alternative arrangement, the fuel tank may comprise one or more double walled side halves rather than top and bottom halves.

Figure 15:
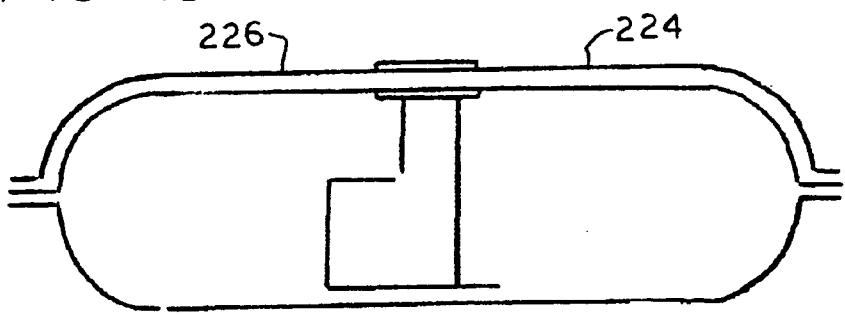
FIG. 15 is a cross-sectional schematic view illustrating the three-sheet assembly high-performance fuel tank having a double-walled top half and noise barrier feature.

Referring again to FIGS. 2, 3, and 4, the exteriorly exposed sheets 26 or 42 forming the exterior walls 34 or 54 may be adapted to provide a thermoformed fuel tank with integral barrier characteristics. The barrier characteristics may include any one or combination of barrier characteristics from the following list of characteristics:

a) A puncture resistant barrier 220 (FIGS. 6 and 8) provided to reduce the penetration of external objects or other vehicle components through the interior sheets 36 or 56 containing the fuel stored within the apparatus. The problem may be better understood by referring to International Publication No. WO 01/00433 to Detourneay et al. Two layers of composite sheet can be fused together to provide a thicker wall in cross section or offset to limit distortion, to overcome the condition problematic in U.S. Pat. No. 6,294,127 issued to Huse.

b) A heat resistant barrier 222 (FIG. 8) provided to deflect the high heat associated with vehicle components, such as, by way of example, exhaust pipes, and return fuel lines, away from thermally conductive polymeric composite sheets 36 and 56 containing the combustible fuel and fuel vapor. The problems may be appreciated by referring to International Publication No. WO 99/44851 to Butler or U.S. Pat. No. 6,268,037 to Butler et al.

c) A scuff resistant barrier 224 (FIG. 15) provided to reduce the wear and tear associated with abrasion of vehicle components flexing upon the fuel tank body as well as the wear and tear associated with the operation of the light-duty vehicle under off-road driving conditions. A scuff resistant barrier may comprise a high-density material with a low co-efficient of friction or a low-density material with a comparably high co-efficient of friction, as preferred.

d) A noise-dampening barrier 226 (FIG. 15) provided to insulate the sloshing sounds associated with fuel movement. The problem may be known by referring to U.S. Pat. No. 6,293,420 to Richter et al or International Publication No. WO 98/36929 to Keller.

e) An anti-deflection barrier 228 provided to rigidify the interior sheets 36 and 56 preventing said interior sheets from deflecting toward each other when pressures within the fuel tank are generated by fuel system components and operation. The problem may be understood by referring to International Publication No. WO 00/47437 to Sadr, or U.S. Pat. No. 6,338,420 to Pachciarz et al.

f) A secondary vapor barrier 230 further reducing the escape of environmentally hazardous fuel vapors from the fuel storage cavity.

g) An intumescent barrier 232 (FIG. 8) that reacts with fire to form a char or inorganic ceramic-like insulator that will extend the length of time before the fuel and fuel vapor within the apparatus combusts.

Although the aforementioned barriers have been suggested for use in conjunction with the exterior members 34 and 54, it is to understood that any of the listed barrier characteristics may be used in any combinations to construct a high-performance thermoformed triple sheet fuel tank.

Figure 6:
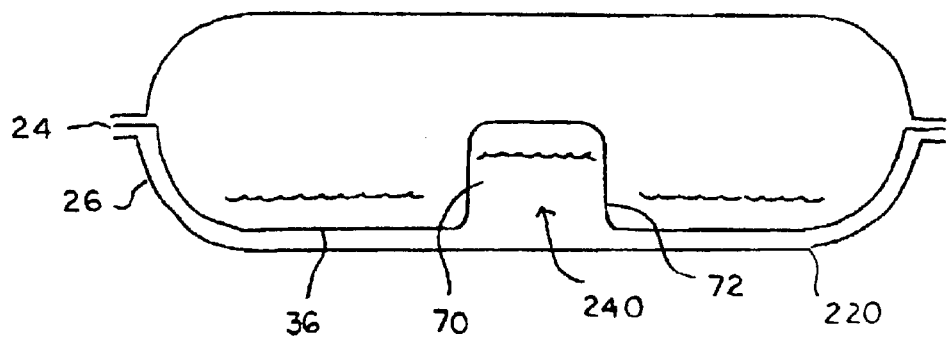
FIG. 6 is a cross-sectional schematic view illustrating the three-sheet assembly high-performance fuel tank having a double-walled bottom half and reserve cavity.
Figure 7:
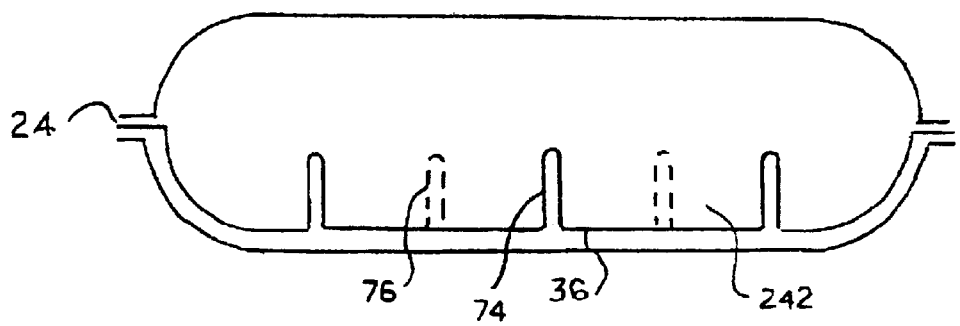
FIG. 7 is a cross-sectional schematic view illustrating the three-sheet assembly high-performance fuel tank having a double-walled bottom half and baffle feature.
Figure 8:
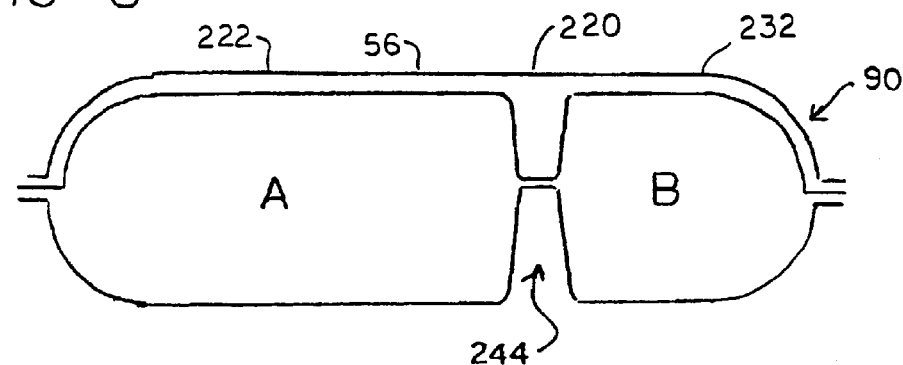
FIG. 8 is a cross-sectional schematic view illustrating the three-sheet assembly high-performance fuel tank having a double-walled top half and dual cavity arrangement.
Figure 9:
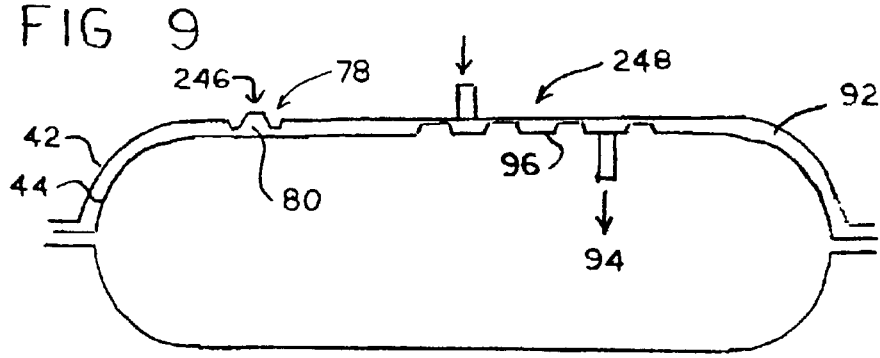
FIG. 9 is a cross-sectional schematic view illustrating the three-sheet assembly high-performance fuel tank having a double-walled top half and cooling feature.
Figure 16:
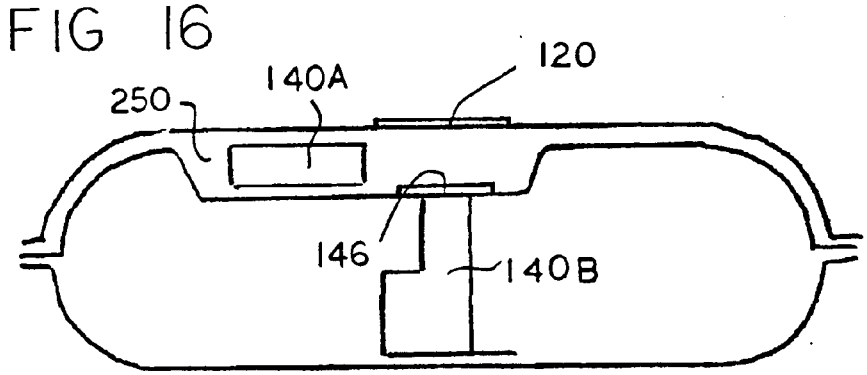
FIG. 16 is a cross-sectional schematic view illustrating the three-sheet assembly high-performance fuel tank having a double-walled top half and a system component.
Figure 17:
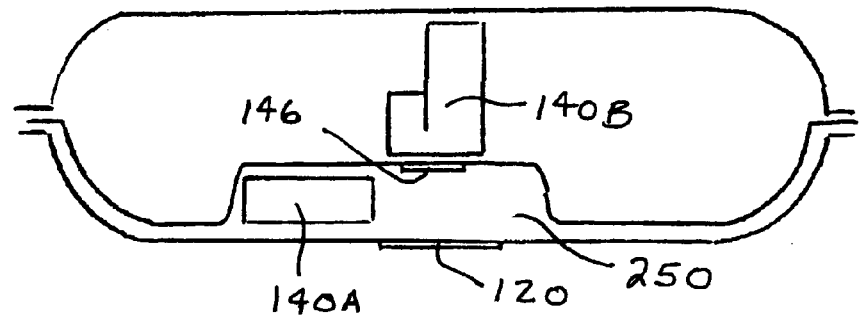
FIG. 17 is a cross-sectional schematic view illustrating the three-sheet assembly high-performance fuel tank having a double-walled bottom half and a system component.

In addition to the exemplary barrier characteristics listed above, the triple and quadruple sheet thermoforming methodologies may also be used to provide a number of functional aspects that have heretofore been difficult to implement with known blow molding and twin sheet thermoforming practices. The functional aspects may include any one or combination of the functional aspects from the following list of functional aspects:

a) A segmented fuel reserve aspect 240 (FIG. 6). As may be appreciated by referring to FIG. 6, sheet 24 forming interior member 36 may be adapted to provide a fuel reserve 70, which is defined by fuel reserve cavity 72, formed between exterior sheet 26 and interior sheet 24. In this arrangement, it may be appreciated that a fuel reserve cavity is instantly thermoformed as an integral aspect of the fuel storage apparatus, the arrangement thus reducing the costs associated with supplying and installing a separate fuel reserve device within a single-walled fuel tank. It may alternately be suggested that the fuel reserve cavity can be incorporated into a suitably adapted double walled top fuel tank half. In other words, the tank of FIG. 6 could be rotated 180°. The benefits and advantages of the present arrangement may be appreciated by referring to U.S. Pat. No. 6,176,260 to Hahner; U.S. Pat. No. 6,223,526 to Wissler et al.; or WO 99/14485 to Siekmann.

b) A baffle aspect 242 (FIG. 7). As may now be appreciated by referring to FIG. 7, sheet 24 forming interior member 36 may be adapted to provide baffling aspects 74 obstructing excessive fuel movement and the sloshing noise of moving fuel within the fuel storage apparatus. The baffle elements 76 may be orientated extending from one side of the vehicle to the other, extending from the front of the vehicle to the back or in both directions. The baffle elements 76 may also be advantageously offset (as suggested in broken line) with respect to one and the other to provide a network of movement limiting interior obstructions.

c) A dual-cavity storage aspect 244 (FIG. 8). Referring now to FIG. 8, an embodiment of a dual-cavity fuel storage tank 90 is suggested. This arrangement is particularly suitable for two-stroke internal combustion engines with an additional engine-oil lubricating system. Dual-cavity fuel storage apparatus may become useful in respect to future engine fuel technologies and hybrid fuel mixtures. As can be seen the cavities of the dual fuel storage apparatus may be segmented in a proportionate aspect consistent with expenditure of the fuel mixtures, herein designated A and B.

d) Fastening aspects 246 (FIG. 9). Referring now to FIG. 9, it may be appreciated that the double walled construction of any of the preferred embodiments of a thermoformed fuel tank may be developed to provide fastening aspects 78. In order to secure a twin sheet fuel tank to the undercarriage of the light-duty vehicle, a more secure combination of straps and fasteners is contemplated, as in U.S. Publication No. 2001/0020622. As may be fully appreciated by referring to FIG. 9 a fastener receiving hollow standoff 80 is seen formed between exterior sheet 42 and interior sheet 44. In this arrangement, a fastener can be used without penetrating the interior sheet 44, which could result in the escape of environmentally hazardous fuel vapors. It may also be appreciated that a plurality of hollow stand-offs with slotted openings may be incorporated into the fuel tank apparatus to provide for the attachment of numerous vehicle and fuel system components.

e) A heat exchange aspect 248 (FIG. 9). Referring again to FIG. 9 it may be known by referring to International Publication No. WO 00/64694 that approximately one-third of the fuel pumped from the tank to the engine is returned to the fuel tank. A relatively high return fuel temperature, usually of the order of 80° C., in high volumes relative the quantity of fuel remaining in a tank may produce unwanted results. Fuel temperature may exceed the heat deflection temperature of the interiorly exposed polymeric surfaces, causing resin precipitation, composition destruction or lasting deformation of the tank body. According to this problem, one or more cavities may be formed between at least two of the polymeric sheets forming the fuel tank apparatus wherein one or more cavities 92 are developed to receive and cool the returning high temperature fuel before its re-entry into a fuel reserve 94. A complex heat exchange channel 96 may be formed in a cavity to assist the control methodology. A return fuel cavity 92 may be positioned adjacent the bottom of the fuel tank to have the benefit of low ambient external temperature, or adjacent the top of the fuel tank to offer insulating distance between a cavity wall and the fuel reserve. It may also be appreciated that the fuel vapor control apparatus and vapor ducts of U.S. Pat. No. 6,276,387 to Pachciarz et al. may be reproduced in functionality through the triple sheet thermoforming method.

f) A fuel system component aspect 250 (FIG. 16). For example, a discreet chamber may be provided to receive a fuel vapor filter/condenser unit. In the case of a deep draw fuel tank, the EVOH barrier layer thins, and permeating vapors are captured before escaping through the exterior barrier into the environment.

Although the aforementioned aspects have been suggested for use in conjunction with one of the fuel tank halves shown, it is to be understood that any of the listed aspects may be used in any combination or re-arrangement to construct a high-performance thermoformed triple sheet fuel tank.

Thus, it may now be appreciated that fuel tank apparatus may be instantly thermoformed out of three or more polymeric sheets to yield fuel tanks having a plurality of engineered sheet compositions, a plurality of integral barrier characteristics, and a plurality of functional aspects that in combination yield high-performance fuel storage apparatus.

Referring now to another enabling aspect of triple sheet thermoforming technology, it has been suggested that fuel tanks must be sub-assembled for final integration into the light-duty vehicle and serviceable in the field by repair technicians. Two approaches characterize a solution to this requirement. In a first approach, which may be known by referring to International Publication No. WO 00/43230, an aperture is provided on the tank body and a fitting is welded adjacent the aperture to accomplish desired means. Although this first approach has been used with some measure of success, the methodology requires post-molding intervention that adds cost and operational complexity. In a second approach, which has been identified in connection with earlier reference International Publication No. WO 99/56977, a blow molded fuel tank is provided with an integral flange that may be opened and sealed for both sub-assembly and in-field repairs. The second approach is preferable because integral flange means are enabled in an instant blow molding operation. The means is used in manufacturing sub-assembly and in-field service and repair.

A plurality of integral external and internal flange means may also be advantageously provided in the practice of triple and quadruple sheet thermoforming. Turning now to FIGS. 10 through 18, it may be understood how integral flanges can be incorporated into high-performance thermoformed fuel storage apparatus.

Figure 10:
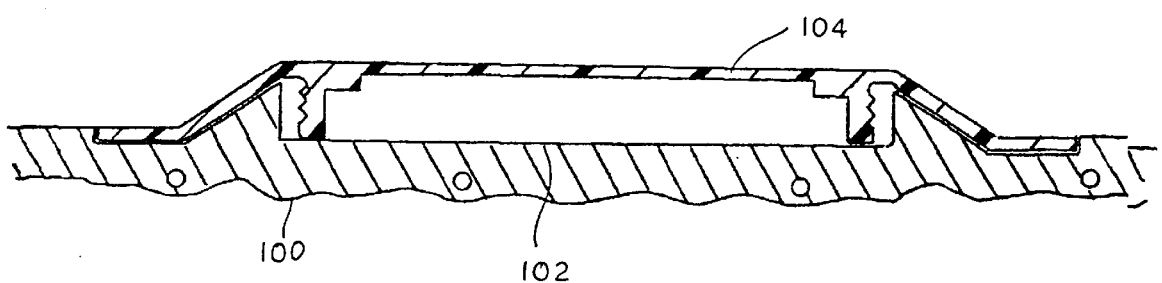
FIG. 10 is a cross-sectional view illustrating a thermoforming mold having a single sheet thereon.
Figure 11:
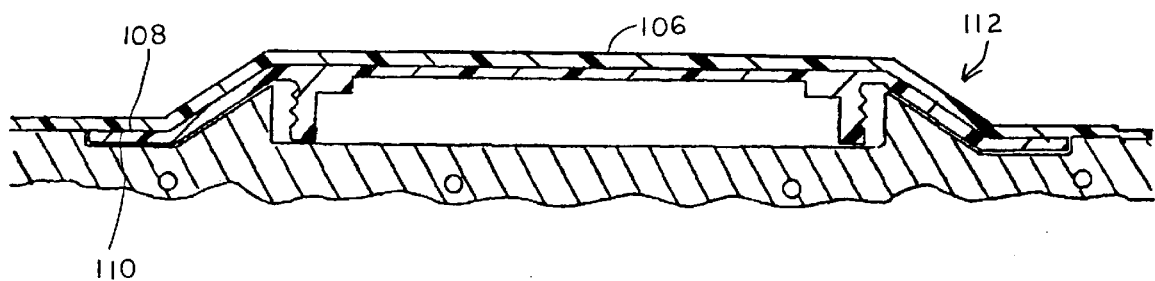
FIG. 11 is a cross-sectional view illustrating a thermoforming mold having a double sheet thereon.

Referring to FIG. 10, a segment of a thermoforming mold 100 with a recess 102 is seen. The recess 102 is annular, but could take many different shapes as preferred. In one preferred thermoforming machine arrangement and method sequence, a shuttle delivery system positioned externally adjacent a form station delivers an injection molded polymeric flange plate 104 for receipt within the recess 102. Next, polymeric composite sheet 106, after suitable heating, is displaced over the mold 100 and the flange plate 104 with the aid of differential pressure. When a heated surface 108 of sheet 106 is compressed upon the exposed surface 110 of the flange plate 104, the surfaces 108 and 110 auto-genously fuse together through molecular cross-linking to form a bond area 112. (It being understood the polymeric compositions of the surfaces 108 and 110 contain compatible polyolefin resin amounts.) In the present arrangement, although the bond area of the surfaces will be substantially permanent, a creep resistant gasket 109 or barrier material may be received within a channel interposed between the surfaces to inhibit permeation of fuel vapors through bond area 112. The arrangement would be appreciated by referring to U.S. Pat. No. 6,305,568 to Suzuki et al.

Figure 13:
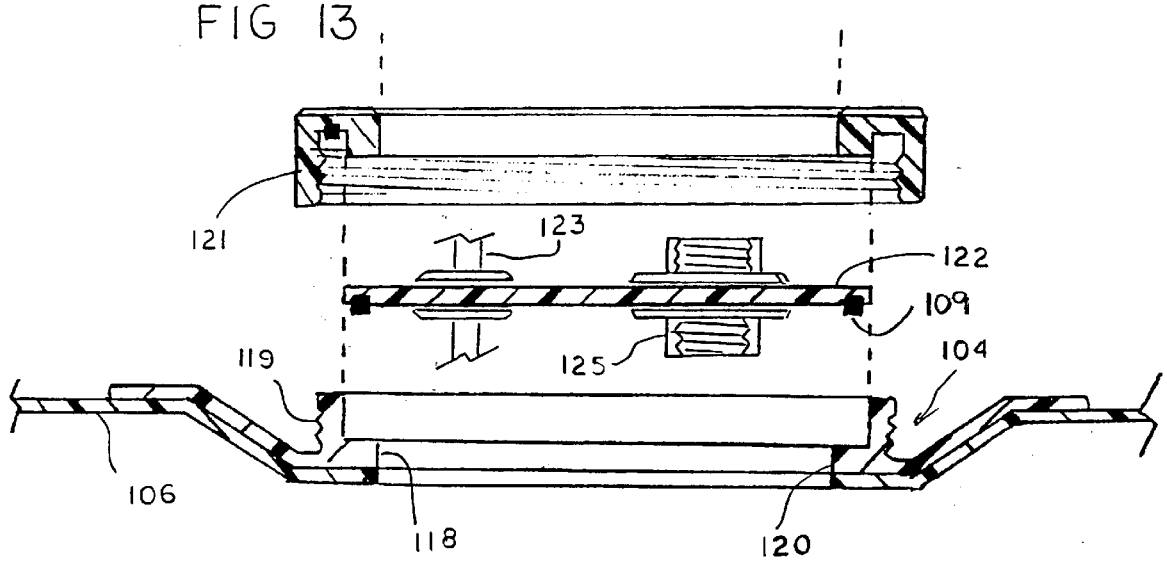
FIG. 13 is an exploded cross-sectional view illustrating the fuel tank of the present invention.
Figure 14:
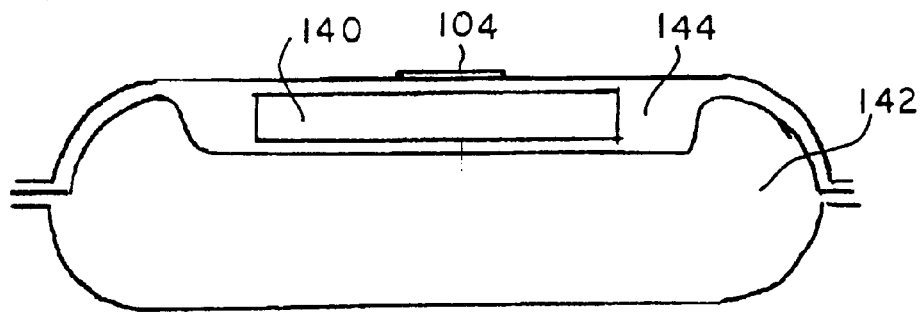
FIG. 14 is a cross-sectional schematic view illustrating the three-sheet assembly high-performance fuel tank having a double-walled top half and a fuel system component.

When sheet 106 is sequentially ejected from the mold the flange plate 104 is recognized as an integral feature of the intended end product. In post-molding operations, an aperture 120 is made in sheet 106 adjacent an interior wall 118 of the flange plate. The aperture 120 provides access to an interior of a fuel tank for sub-assembly. The interior wall 118 may include a threaded aspect 119. The threads receive a bushing 121 to that compresses a plate 122 against the interior wall to close the aperture. The arrangement is seen in FIG. 13. The aperture plate 122 includes electrical connector aspects 123 and hose connector aspects 125. The aperture plate is provided with integral electrical and hose connectors to minimize the number of openings in the body of the fuel tank. As there will be several apertures in the plate, it cannot be rotated in a threading manner. The compression bushing threads over the plate, which remains substantially stationary. It should also be noted that the flange plate 104 is interiorly disposed upon the surface of the intended end product to reduce the vertical space occupied by the apparatus. This is in marked contrast to the inspection tower of U.S. Pat. No. 6,179,145, which is exteriorly disposed upon a fuel tank surface.

Furthermore, one or more flange plates having different insert receiving aspects may be employed to provide a plurality of inter-connection points as suggested by the different fuel system components. On such flange plate would be offered for specifically connecting the fuel filler assembly to the fuel tank. Additionally, a plurality of flange plates may be integrally fused in the thermoforming process to a plurality of the polymeric sheets forming the fuel tank. One or more shuttle carriages would therefore be adapted to place flange plates upon mold or molded recesses for final integration onto the polymeric sheets forming a fuel tank.

Finally, a flange plate may be inserted into a molded recess formed in a first polymeric sheet and a subsequent molded polymeric sheet could than be compressed against the first sheet over the flange plate to provide an enclosed flange plate accessible through two apertures opened in fuel tank. The arrangement is enabled in fuel tank 500.

It may thus be appreciated that a first aperture is provided so that second apertures can be opened as suggested by the means of flange plates. It should be understood, however, that the invention is not intended to be limited by the specific sequences, flange plates, inserts and multiple locations described herein, but may include other such embodiments as preferred by the triple sheet practitioner.

The flange plates facilitate SIB advantages. Triple sheet fuel tanks facilitate multiple SIB aspects. Multiple flange plates facilitate access to multiple SIB aspects. As suggested in FIGS. 14, 15, 16, and 17, fuel system components 140 may be interiorly positioned in a fuel reserve section 142 and or a component section 144 of a triple or quadruple sheet fuel tank. It may also be noted here that the fuel system components would be sub-assembled upon a component cradle 146 as means for delivery and pre-placement of the subsystem between first and second or second and third sheets by an external shuttle apparatus adjacent a form station. This apparatus is described below and in the aforementioned references toward triple sheet thermoforming apparatus. Therefore, one or more fuel system component packages 140A and 140B can be advantageously positioned within a first or second interior cavity of the triple sheet article. Access to the interior packages is provided by an external aperture 120 and an internal aperture 146, it being understood internal aperture includes a second flange plate 104. Although four SIB configurations are suggested, other triple and quadruple sheet adaptations can be made and these fall within the scope of present invention.

Figure 18:
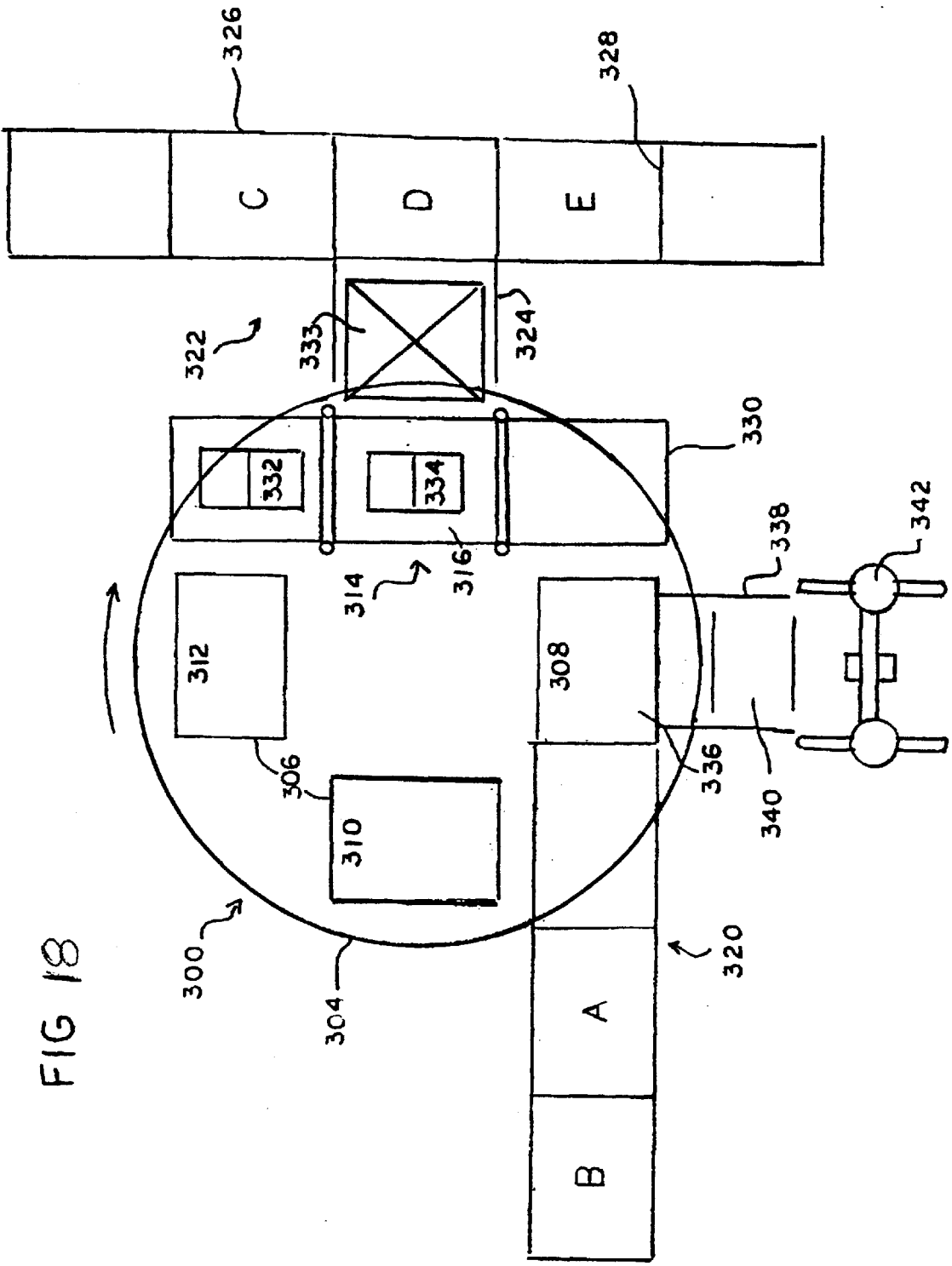
FIG. 18 is a diagrammatic view showing the manufacturing process employed with the present invention.
Figure 19:
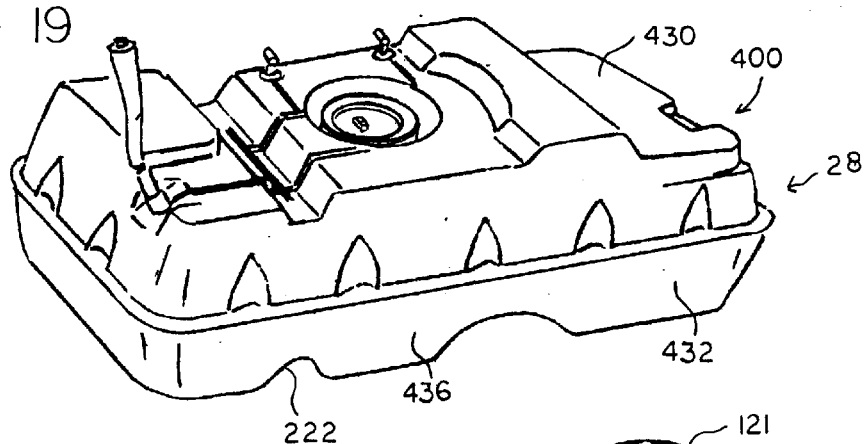
FIG. 19 is a perspective view illustrating an exemplary fuel storage apparatus.
Figure 20:
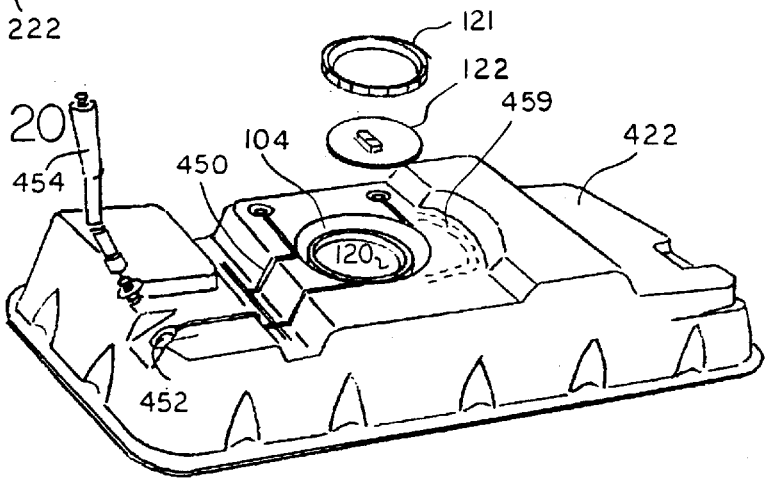
FIG. 20 is a perspective view illustrating the top half of the exemplary fuel storage apparatus.

The shuttle apparatus employed to deliver the packages into a fuel tank is suggested to advantage in FIG. 18. A plan view of one triple sheet thermoforming machine 300 suitable for the manufacture of a triple sheet fuel tank is shown.

The machine conforms to a (four or six station) rotary machine configuration, although a linear machine configuration and parallel operating machines, as suggested in U.S. Publication No. 2002/0017745 to Vorenkamp et al., fall within the scope of the present invention. A machine comprises a machine frame 302 upon which is suspended a frame support 304. The frame support involves clamp frames 306, and each clamp frame carries one polymeric composite sheet as the frame support is indexed forward in desired increments. The frames advance successive sheets through at least three ovens 308, 310, and 312 to a form station 314. At the form station a plurality of heat deformable sheets are sequentially molded and instantly compressed together between opposed platens 316 and 318 to yield a unitary article. Although the arrangement suggests a four station rotary configuration, the five and six station rotary configurations fall within the scope of the present invention.

Apparatus external to the machine frame is provided to enable the manufacture of a triple sheet fuel tank. A sheet loading shuttle system 320 is deployed to sequentially deliver sheet selected from an inventory of polymeric composite sheets A and B to the frames. Although a two-sheet, delivery system is suggested, single or multiple sheet delivery systems fall within the scope of the present invention. A SIB loading shuttle system 322 is deployed adjacent the form station 314. A first shuttle and track system 324 projecting into the form station uses a carriage 333 to sequentially deliver externally supplied flange plates and sub-assembled packages for incorporation into the intended end product. Cooperating with the shuttle and track system is a sub-assembly delivery track sub-system 326. The present sub-system suggests three SIB packages C, D, and E on a five-segment sub-track 328, although both single and multiple segmented sub-tracts fall within the scope of the invention. Additionally, the shuttle track system projects into the form station in a position intermediate the wheel and a lower platen 318, however, an upper shuttle track system with elements projecting intermediate the wheel and an upper platen 316 also falls within the scope of the invention. The upper shuttle track system may be developed to deliver insert packages into the form station, or the upper shuttle track system may be developed to provide a plug assist function to distribute the heat deformable sheet material more uniformly upon a mold surface. This arrangement may in fact be preferred to prevent over-thinning of a composite layer or barrier material such as 202. According to this concern, a lower platen shuttle system, as in the upper platen shuttle system 330, which moves two molds 332 and 334 into and out of the platen 316, may be employed to provide a reciprocating lower platen molding tool and plug assist shifting apparatus. Therefore, a plurality of lower and upper shuttle systems may be used to deliver multiple packages or provide assisting means, and all such derivations fall within the scope of the invention.

Adjacent a load and unload station 336 is intermediate apparatus 338 delivering ejected articles through an external cooling region 340 characterized by known controlled cooling apparatus and procedures. The ejected articles travel through the cooling region to a 5-axis CNC trimming station 342. CNC routers remove recyclable process materials from the body of the thermoformed articles and open apertures for further final sub-assembly operations.

The machine 300 is configured to manufacture the fuel storage apparatus indicated by 400 and 500 in the following figures, which are provided for illustration purposes of the flexibility of the triple sheet thermoforming processes. The fuel storage apparatus indicated by fuel tank 400 is represented in FIGS. 19 through 22, and is described below.

Fuel tank 400 represents a detailed embodiment of fuel tank 28 characterized with a double walled bottom 432 and a single walled top 430. The bottom comprises sheets 424 and 426. Sheet 426, constituting sheet B, is thermoformed to provide the exterior bottom wall 436. Sheet B, as the present case so admits, is distinguished from sheet A, which is intended to contain the fuels of the intended apparatus. Sheet A1 forms the top 430 of the fuel tank and sheet A2 forms the inside wall 434 of the fuel tank. The A sheet is characterized as having composition 202 contained therein for vapor barrier purposes.

Figure 23:
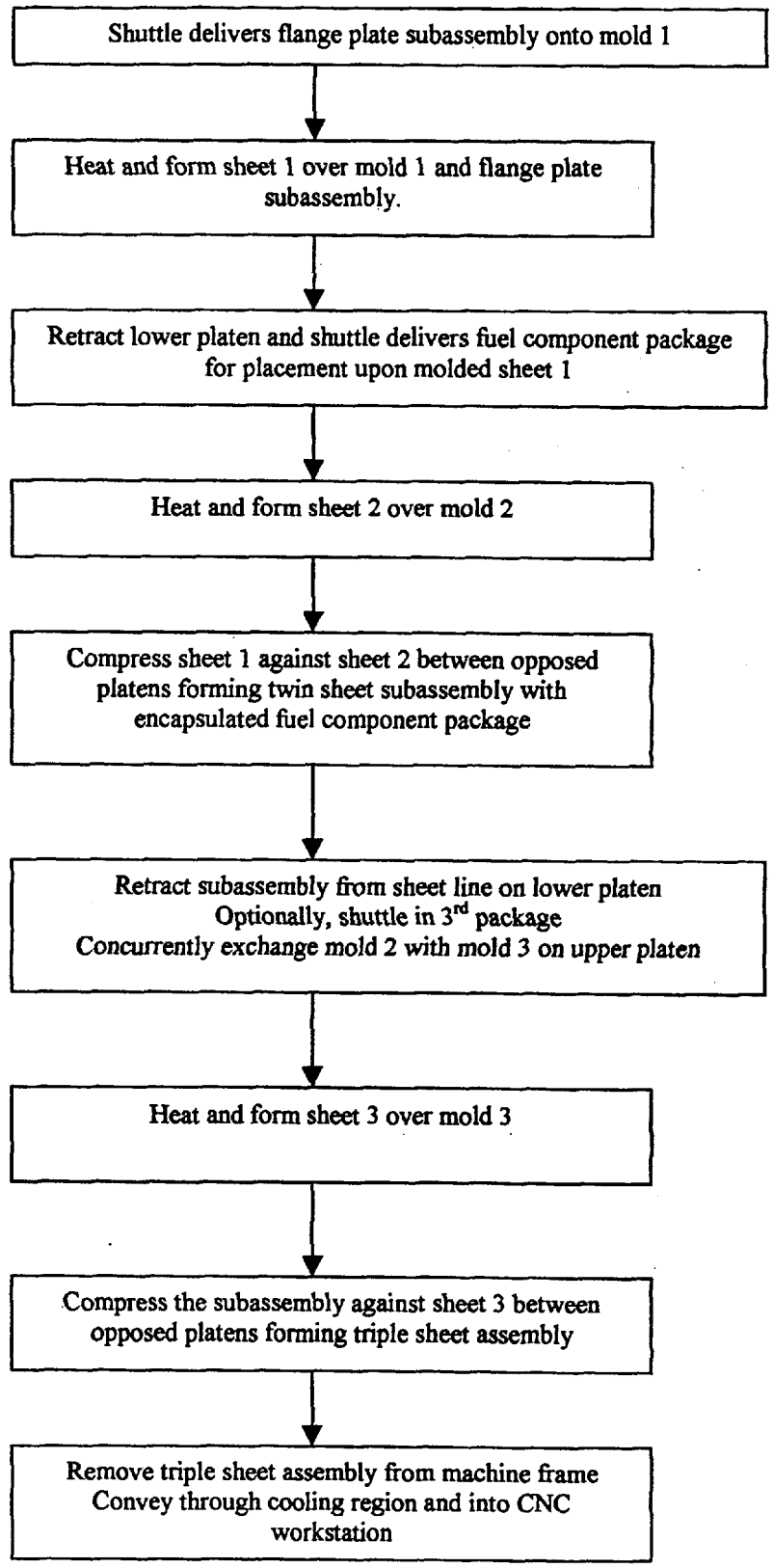
FIG. 23 is a flow chart illustrating a method of manufacturing a three-sheet high-performance fuel tank.

The fuel tank 400 is manufactured on the machine 300 according to the following method sequence of FIG. 23, which machine sequence functions relate in the present restricted case to the method sequence functions at the form station and adjacent the form station. The process sequence is upside down from the view of the FIGS. First, the flange plate 104 is positioned onto the first mold. The flange plate, indicated by package C, includes an integral plastic grid 450 that supports a plurality of flange plates for one-step insertion onto the mold. For example, one flange plate 452 is provided for installation of the fuel filler assembly 454. Second, the first sheet 422 is thermoformed over the first mold and the plastic grid 450, the grid permanently fusing to the first sheet. The first molded sheet is retracted from a sheet line by movement of the lower platen 318. While the lower platen is retracted, the carriage 333 of the shuttle system 324 delivers a second package D comprising fuel system components supported upon cradle 146. The cradle is deposited upon a visible surface of the first molded sheet. Simultaneously, a second sheet is thermoformed over a second mold supported upon the upper platen 316. The package-delivering shuttle may carry packages below and include plug assist apparatus above to assist in the formation of a catenary sheet. Fourth, the lower platen is extended into the upper platen compressing the first sheet against the second sheet in a twin-sheet phase, the first and second sheets being permanently fused together where they communicate and cross-link at temperature and pressure. (The package D is enclosed between two composite polymeric sheets.) Fifth, after a dwell period, a frame releases the second sheet allowing the lower platen to retract while carrying the twin-sheet subassembly. Simultaneously, the upper platen retracts a fixed distance and the second mold is replaced with a third mold, by means of the upper platen shuttle system 330. Concurrently and optionally, package E is offered for delivery upon the second sheet. Sixth, the third sheet is thermoformed over the third mold supported upon the upper platen. Seventh, the lower platen is extended into the upper platen compressing sections of the visible surface of the second sheet of the twin-sheet assembly against sections of the third sheet in a triple-sheet phase, the second and third sheets being permanently fused together where they communicate and cross-link. Finally, the platens retract and a frame holding the instant third sheet indexes the triple-sheet assembly to the load/unload station for further processing as anticipated in the prior description. A triple sheet article 400 is thus provided.

Figure 21:
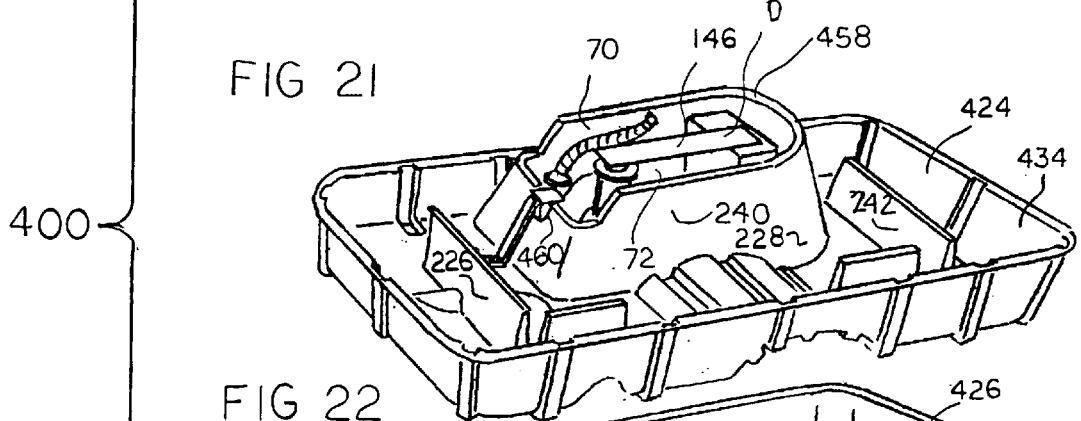
FIG. 21 is a perspective view illustrating the interior sheet of the exemplary fuel storage apparatus.
Figure 22:
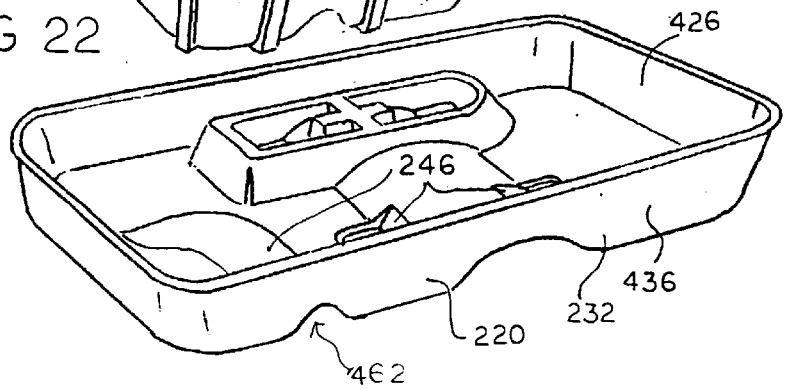
FIG. 22 is a perspective view illustrating the bottom half of the exemplary fuel storage apparatus.

In the process of thermoforming the sheets over their respective mold surfaces certain barrier characteristics and functional aspects can be incorporated into the design of one such fuel storage apparatus 400. As seen in FIG. 21 these characteristics and aspects include baffles 242 and fuel reserve 240. It may now also be appreciated that a segment 458 of the fuel reserve 70 communicates with molded sheet 422, fusing together (in the area 459 suggested in broken line detail) to provide a sealed fuel reserve cavity 72. Details 460 are provided to provide fuel passage from the fuel supply to the fuel reserve. As seen in connection with FIG. 22, the exterior sheet 426 comprises heat-shielding compositions 462 adjacent a tail pipe and fastening aspects 246 for receiving straps and the like supporting the fuel tank upon the light-duty vehicle. It is advantageous to provide localized barrier properties, such as for the heat sensitive area 462 by adding a barrier laminate upon a surface of a composite sheet as would be suggested in FIGS. 19 and 20 of co-pending U.S. Pat. No. 09/770,097. Such an arrangement would increase the efficiency of the article by reducing its overall use of potentially expensive material costs.

Moving on, fuel tank 500, represented in FIGS. 24, 25, 26 and 27, has a double-walled top 550 and single walled bottom 552 as in the fuel tank 48 of FIG. 3. The top comprises exterior composite polymeric sheet 554 and interior composite polymeric sheet 556. The bottom comprises composite polymeric sheet 558.

The fuel tank 500 is manufactured on the machine 300 according to the method sequence of FIG. 23. A second package 140A comprising flange plates 104B and 104C and fuel system components is laid to rest upon sheet 554. The second sheet 556 is sequentially compressed upon the flange plates and the surrounding sheet, to encapsulate the flange plates between two composite polymeric sheets. A post-molding aperture 120 is opened in the fuel tank by removing overlaying sections of the recognized work pieces upon the CNC trimmer 342. The flange plate 104B includes interior threads that are exposed when the apertures are made to receive the members of a lid assembly 560. The aperture of sheet 556 provides access to a third package 140B of fuel system components within the interior fuel reserve.

In the process of thermoforming the sheets of fuel tank 500 over their respective mold surfaces certain barrier characteristics and functional aspects can be incorporated into the design of fuel storage apparatus. A vapor fuel filter canister 562 is provided to re-circulate fuel vapors permeating into the component section 144 from the fuel reserve section 142. The filter canister is accessible through flange plate 104A. Details 460 are opened through sheets 554 and 556 for connecting the fuel filler assembly 454 to provide fuel passage from the fuel supply to the fuel reserve. The top exterior sheet 554 has composition 200 also providing heat resistant barrier 222. The plate 122 of the lid assembly 560 includes electrical and hose connector aspects 123 and 125, respectively to provide the necessary connector means of the apparatus.

Another advantage of providing a three-sheet fuel storage tank is so that fuel tank instrumentation can be accommodated. For example, a wireless communications devise may be deposited between the sheets for remote or local communication objectives. A hydrocarbon sensor may record hydrocarbon levels and communicate data indicative of these records automatically by remote communication, or in reply to local inquiry. A fuel quality sensor may be used to regulate ownership compliance. A fuel vapor filter sensor may be used to schedule maintenance wirelessly. Communications and Information Technology systems are deployed to assure tank emission compliance and renew licenses where required.

Figure 12:
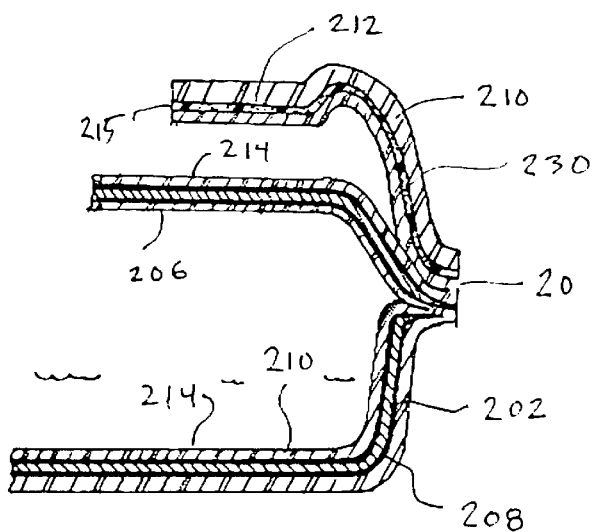
FIG. 12 is a partial cross-sectional schematic view illustrating the three-sheet assembly high-performance tank having multiple layers of separate materials all applied thereto and formed simultaneously.

Furthermore, with particular reference to blow molding technology, the present invention provides a number of advantages. Specifically, the present invention, being thermoformed, is more economical than blow molding since thermoforming is capable of producing multiple pieces simultaneously, while blow molding is merely capable of producing a single shot at a time. Furthermore, as seen in FIG. 12, the thermoformed fuel tank of the present invention could include multiple layers (i.e. 18 for example) of separate material. It would be unlikely to arrange eighteen extrusion lines to blow mold a triple layer fluid container with a top member, a bottom member, and a middle member having a hole.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid container for storing a fluid comprising:
   a first sheet member;
   a second sheet member; and
   a third sheet member coupled between said first sheet member and said second sheet member, said first sheet member and said third sheet member together defining a first volume, said second sheet member and said third sheet member together defining a second volume, said first volume being fluidly isolated from said second volume.

2. The fluid container according to claim 1 wherein at least one of said first sheet member, said second sheet member, and said third sheet member is a layer capable of deflecting heat away from at least one of said first volume and said second volume.

3. The fluid container according to claim 1 wherein at least one of said first sheet member, said second sheet member, and said third sheet member is a vapor barrier.

4. The fluid container according to claim 1 wherein at least one of said first sheet member, said second sheet member, and said third sheet member is electrically conductive.

5. The fluid container according to claim 1 wherein at least one of said first sheet member, said second sheet member, and said third sheet member is made of a thermoplastic resin.

6. The fluid container according to claim 5 wherein said thermoplastic resin is chosen from the group consisting essentially of polyethylene, polypropylene, and polyolefin.

7. The fluid container according to claim 1 wherein at least one of said first sheet member, said second sheet member, and said third sheet member is made of a filled polyolefin material chosen from the group consisting essentially of talc, silica, glass fibers or beads, cellulose, natural fibers, organic matter, a thermosetting resin, carbon, a pigment, metallic particles, nanocompounds and fire retardant substances.

8. The fluid container according to claim 1, further comprising:
   a radio frequency device coupled to at least one of said first sheet member, said second sheet member, and said third sheet member, said radio frequency device being operable to output a signal.

9. The fluid container according to claim 1 wherein at least one of said first sheet member, said second sheet member, and said third sheet member is made of a polymeric material.

10. The fluid container according to claim 1 wherein said first volume serves as at least a puncture barrier, a noise-dampening barrier, a structural reinforcement, a vapor barrier, or a fire barrier.

11. The fluid container according to claim 1, further comprising:

a plurality of protrusions formed in said third sheet member, said plurality of protrusions extending into said first volume, said plurality of protrusions obstructing fluid flow in said first volume.

12. The fluid container according to claim 1 wherein one of said first sheet member and said third sheet member includes a protrusion extending toward the other of said first sheet member and said third sheet member to separate said first volume into discrete volumetric sections.

13. The fluid container according to claim 1, further comprising:
a fastener coupled to said first sheet member, said fastener being separate from said second volume.

14. The fluid container according to claim 1, further comprising:
a fuel system component coupled between said first sheet member and said second sheet member.

15. The fluid container according to claim 1, further comprising:
a fourth sheet member coupled between said first sheet member and said third sheet member.

16. The fluid container according to claim 1 wherein said first sheet member, said second sheet member, and said third sheet member are simultaneously coupled together to form a unitary member.

17. A fuel tank for containing a fuel, said fuel tank comprising:
a first polymeric sheet;
a second polymeric sheet; and
a third polymeric sheet coupled between said first polymeric sheet and said second polymeric sheet, said first polymeric sheet and said third polymeric sheet together defining a first volume, said second polymeric sheet and said third polymeric sheet together defining a second volume, said first volume being isolated from said second volume.

18. The fuel tank according to claim 17 wherein said third polymeric sheet is adjacent said first polymeric sheet to define a barrier.

19. The fuel tank according to claim 18 wherein said barrier is generally heat resistant, vapor impervious, puncture resistant, or noise-dampening.

20. The fuel tank according to claim 17 wherein at least one of said first polymeric sheet, said second polymeric sheet, and said third polymeric sheet is made of a thermoplastic resin.

21. The fuel tank according to claim 20 wherein said thermoplastic resin is chosen from the group consisting essentially of polyethylene, polypropylene, and polyolefin.

22. The fuel tank according to claim 17 wherein at least one of said first polymeric sheet, said second polymeric sheet, and said third polymeric sheet is electrically conductive.

23. The fuel tank according to claim 17 wherein at least one of said first polymeric sheet, said second polymeric sheet, and said third polymeric sheet is made of a filled polyolefin material chosen from the group consisting essentially of talc, silica, glass fibers or beads, cellulose, natural fibers, organic matter, a thermosetting resin, carbon, a pigment, metallic particles, nano-compounds and fire retardant substances.

24. The fuel tank according to claim 17, further comprising:
a radio frequency device is mounted substantially between said first polymeric sheet and said third polymeric sheet, said radio frequency device being operable to output a signal.

25. The fuel tank according to claim 17, further comprising:
a plurality of protrusions formed in said third polymeric sheet, said plurality of protrusions extending into said first volume, said plurality of protrusions obstructing fluid flow in said first volume.

26. The fuel tank according to claim 17 wherein one of said first polymeric sheet and said third polymeric sheet includes a protrusion extending toward the other of said first polymeric sheet and said third polymeric sheet to separate said first volume into discrete volumetric sections.

27. The fuel tank according to claim 17, further comprising:
a fastener coupled to said first polymeric sheet, said fastener being separate from said second volume.

28. The fuel tank according to claim 17, further comprising:
a fuel system component coupled between said first polymeric sheet and said third polymeric sheet.

29. The fuel tank according to claim 17, further comprising:
a fourth polymeric sheet coupled between said first polymeric sheet and said third polymeric sheet.

30. The fuel tank according to claim 17 wherein said first polymeric sheet, said second polymeric sheet, and said third polymeric sheet are simultaneously coupled together to form a unitary member.

31. A fuel tank comprising:
at least three extruded polymeric sheets arranged to define a first tank section and a second tank section, said at least three extruded polymeric sheets being thermoformed; and
an aperture formed in one of said at least three extruded polymeric sheets to provide access to said first tank section via said second tank section.

32. The fuel tank according to claim 31, further comprising:
a hydrocarbon barrier formed on at least one of said first tank section and said second tank section, said hydrocarbon barrier operable to inhibit fluid or vapor transmission therethrough.

33. The fuel tank according to claim 31 wherein at least one of said at least three extruded polymeric sheets is made of a filled polyolefin material chosen from the group consisting essentially of talc, silica, glass fibers or beads, cellulose, natural fibers, organic matter, a thermosetting resin, carbon, a pigment, metallic particles, nano-compounds and fire retardant substances.

34. The fuel tank according to claim 31, further comprising:
a radio frequency device is mounted generally within said second tank section, said radio frequency device being operable to output a signal.

35. The fuel tank according to claim 31, further comprising:
a plurality of protrusions formed in at least one of said at least three extruded polymeric sheets, said plurality of protrusions extending into said second tank section, said plurality of protrusions obstructing fluid flow in said second tank section.

36. A fuel tank having three co-extruded thermoformed polymeric sheets, said fuel tank comprising:
a first fuel tank section having a wall operable to contain a fuel, said first fuel tank section having a first hydrocarbon barrier layer interfacially fused to an inside surface of said wall and a second hydrocarbon barrier layer interfacially fused to an outside surface of said wall; and a second fuel tank section having a wall operable to contain escaping fuel vapors.

37. The fuel tank according to claim 36, further comprising:

a third hydrocarbon barrier layer interfacially fused to an inside surface of said wall of said second fuel tank section.

38. The fuel tank according to claim 36, further comprising:

a resealable aperture formed in said first fuel tank section that is accessible through said second fuel tank section.

39. The fuel tank according to claim 38 wherein said resealable aperture is thermoformed.

40. A method of manufacturing a fuel tank, said method comprising:

thermoforming a first polymeric sheet to a predetermined shape;

thermoforming a second polymeric sheet to a predetermined shape;

thermoforming a third polymeric sheet to a predetermined shape;

coupling said first polymeric sheet to said second polymeric sheet to form a two sheet subassembly having a first volume; and coupling said third polymeric sheet to said two sheet subassembly to form a three sheet subassembly having a second volume, said second volume being separate from said first volume.

41. The method according to claim 40, further comprising:

coupling a radio frequency device substantially between said first polymeric sheet and said second polymeric sheet, said radio frequency device being operable to send or receive a signal.

42. The method according to claim 40, further comprising:

coupling a fuel system component coupled between said first polymeric sheet and said second polymeric sheet.

43. The method according to claim 40, further comprising:

thermoforming a fourth polymeric sheet to a predetermined shape; and coupling said fourth polymeric sheet to said three sheet subassembly to form a four sheet subassembly having a third volume, said third volume being separate from said first volume and said second volume.

44. The method according to claim 40 wherein said thermoforming a second polymeric sheet to said predetermined shape includes forming a plurality of protrusion in said second sheet.

* * * * *